US011335337B2

(12) United States Patent
Hayakawa et al.

(10) Patent No.: US 11,335,337 B2
(45) Date of Patent: May 17, 2022

(54) INFORMATION PROCESSING APPARATUS AND LEARNING METHOD

(71) Applicant: FUJITSU LIMITED, Kawasaki (JP)

(72) Inventors: Shoji Hayakawa, Akashi (JP); Shouji Harada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 20 days.

(21) Appl. No.: 16/675,692

(22) Filed: Nov. 6, 2019

(65) Prior Publication Data

US 2020/0211535 A1  Jul. 2, 2020

(30) Foreign Application Priority Data

Dec. 27, 2018 (JP) .............................. JP2018-244932

(51) Int. Cl.
*G10L 15/22* (2006.01)
*G10L 15/187* (2013.01)
*G10L 25/30* (2013.01)
*G10L 15/18* (2013.01)

(52) U.S. Cl.
CPC ........ *G10L 15/187* (2013.01); *G10L 15/1807* (2013.01); *G10L 15/22* (2013.01); *G10L 25/30* (2013.01)

(58) Field of Classification Search
CPC ....... G10L 13/08; G10L 15/187; G10L 17/04; G10L 2015/0631; G10L 25/78; G10L 15/06
USPC ........................................................ 704/254
See application file for complete search history.

(56) References Cited

U.S. PATENT DOCUMENTS

| 5,893,058 A | * | 4/1999 | Kosaka | ................... G10L 15/32 704/238 |
| 2010/0010949 A1 | * | 1/2010 | Ito | ........................ G06N 3/0454 706/20 |
| 2019/0130896 A1 | * | 5/2019 | Zhou | ....................... G10L 15/16 |

FOREIGN PATENT DOCUMENTS

| JP | 2007-219286 | 8/2007 | |
| JP | 2008-123447 | 5/2008 | |
| JP | 2015-056685 | 3/2015 | |
| JP | 2015-099304 | 5/2015 | |
| WO | WO-2016181951 A1 * | 11/2016 | ............... G06N 3/04 |

OTHER PUBLICATIONS

Douglas O'Shaughnessy, "Automatic Speech Recognition," in Speech Communications: Human and Machine , IEEE, 2000, pp. 367-435, doi: 10.1109/9780470546475.ch10. (Year: 2000) (Year: 2000).*

* cited by examiner

*Primary Examiner* — Bharatkumar S Shah
(74) *Attorney, Agent, or Firm* — Staas & Halsey LLP

(57) ABSTRACT

An information processing apparatus includes a memory; and a processor coupled to the memory and the processor configured to: generate phoneme string information in which a plurality of phonemes included in voice information is arranged in time series, based on a recognition result of the phonemes for the voice information; and learn parameters of a network such that when the phoneme string information is input to the network, output information that is output from the network approaches correct answer information that indicates whether a predetermined conversation situation is included in the voice information that corresponds to the phoneme string information.

20 Claims, 28 Drawing Sheets

INFORMATION PROCESSING APPARATUS AND LEARNING METHOD

CROSS-REFERENCE TO RELATED APPLICATION

This application is based upon and claims the benefit of the prior Japanese Patent Application No. 2018-244932, filed on Dec. 27, 2018, the entire contents of which are incorporated herein by reference.

FIELD

The embodiments discussed herein are related to an information processing apparatus and a learning method.

BACKGROUND

In recent years, call centers have recorded conversations between operators and customers, and accumulated information of the recorded conversations. A call center has a desire to improve services by utilizing accumulated conversation information.

For example, there are the following techniques that utilize accumulated conversation information. There is a related art for determining the number of predetermined keywords included in a conversation between a customer and an operator, and displaying FAQ (Frequently Asked Questions) or notifying a supervisor according to the determined number of keywords. There is also a related art for converting an operator's voice into character strings and checking whether or not a keyword to be delivered is included in the character strings, so as to determine whether or not an operator appropriately delivers the contents to be delivered to a customer.

Related techniques are disclosed in, for example, Japanese Laid-open Patent Publication No. 2015-056685, Japanese Laid-open Patent Publication No. 2008-123447, Japanese Laid-open Patent Publication No. 2007-219286, and Japanese Laid-open Patent Publication No. 2015-099304.

A call center has a desire to detect whether or not a specific conversation situation designated in advance exists in a conversation between an operator and a customer. Here, in a case where the above-described techniques of the related arts are used to detect whether or not a specific conversation situation exists, it may be conceivable to perform a process of exhaustively setting keywords according to a conversation situation desired to be detected and determining whether or not the set keywords are included in conversation information.

However, it is difficult to know in advance how many keywords need to be exhaustively set in order to detect the specific conversation situation. In addition, since conversation contents having the same meaning may be expressed in various ways, it is difficult to set keywords exhaustively by hand.

SUMMARY

According to an aspect of the embodiments, an information processing apparatus includes a memory; and a processor coupled to the memory and the processor configured to: generate phoneme string information in which a plurality of phonemes included in voice information is arranged in time series, based on a recognition result of the phonemes for the voice information; and learn parameters of a network such that when the phoneme string information is input to the network, output information that is output from the network approaches correct answer information that indicates whether a predetermined conversation situation is included in the voice information that corresponds to the phoneme string information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, embodiments will be described in detail with reference to the accompanying drawings. In addition, the present disclosure is not limited to the embodiments.

First Embodiment

Figure 1:
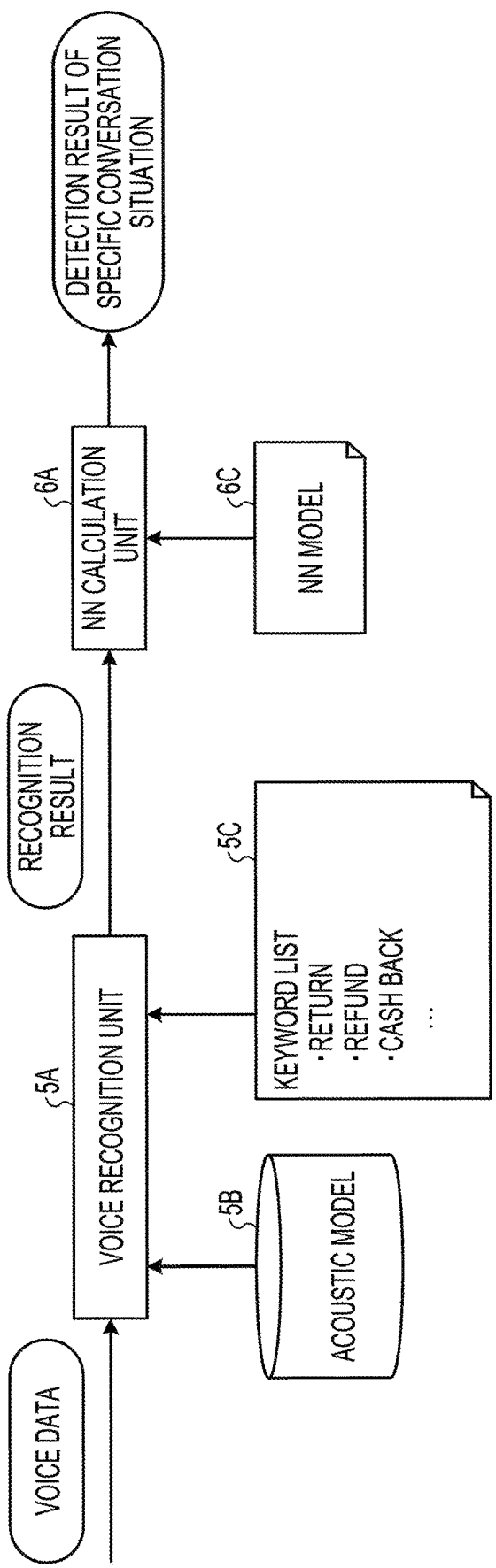
FIG. 1 is a view for explaining an example of a reference technique.

Prior to describing the processing of a learning device according to a first embodiment, a reference technique will be described. This reference technique is not a prior art. FIG. 1 is a view for explaining an example of the reference technique. As illustrated in FIG. 1, the reference technique includes a voice recognition unit 5A and an NN (Neural Network) calculation unit 6A.

When voice data is input, the voice recognition unit 5A extracts character strings included in the voice data based on an acoustic model 5B, and recognizes whether or not the extracted character strings correspond to a keyword defined in a keyword list 5C. The voice recognition unit 5A outputs the recognition result to the NN calculation unit 6A.

The NN calculation unit 6A inputs the recognition result of the voice recognition unit 5A to an NN (not illustrated) based on a learned NN model 6C, so as to calculate an output value indicating whether or not a specific conversation situation is included in the voice data. Here, in order to appropriately detect the specific conversation situation, keywords relating to the specific conversation situation are exhaustively set in the keyword list 5C, and the NN model 6C is learned using the keyword list 5C. However, it is difficult to know in advance how many keywords need to be exhaustively set in order to be able to detect the specific conversation situation. In addition, when the keyword list 5C is introduced to different call centers, it is desirable to adjust the keyword list 5C to be unique for each call center at the time of the introduction, and in order to detect the specific conversation situation with high accuracy, a lot of man-hours for setting and adjusting keywords are necessary.

Figure 2:
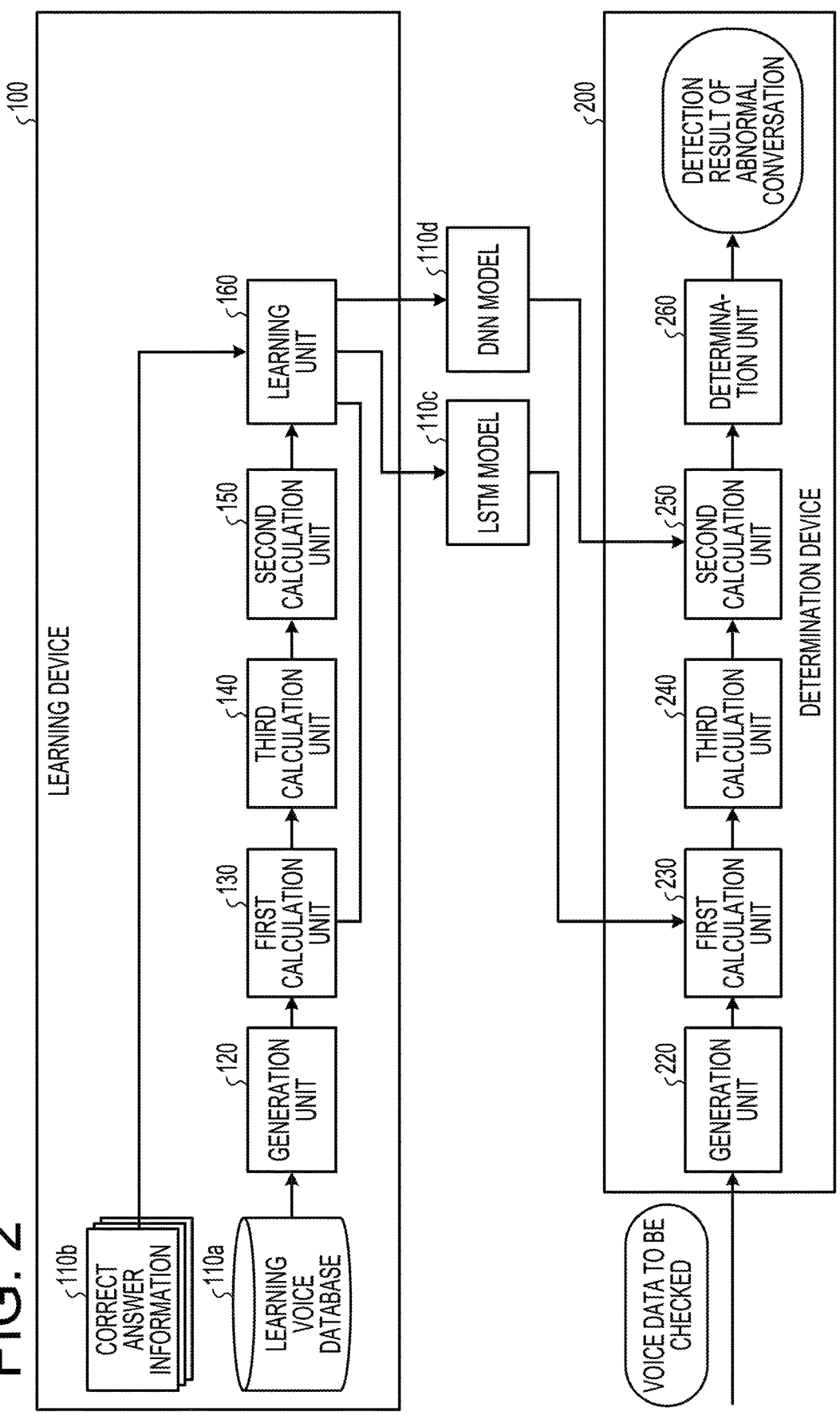
FIG. 2 is a view for explaining an example of processing of a learning device and a determination device according to a first embodiment.

Subsequently, an example of processing of a learning device and a determination device according to a first embodiment will be described. FIG. 2 is a view for explaining an example of processing of the learning device and the determination device according to the first embodiment. As illustrated in FIG. 2, a learning device 100 includes a learning voice database 110a, a generation unit 120, a first calculation unit 130, a third calculation unit 140, a second calculation unit 150, and a learning unit 160. The first calculation unit 130, the third calculation unit 140, the second calculation unit 150, and the learning unit 160 correspond to a learning processing unit.

The learning voice database 110a stores a plurality of learning voice data, each of which is associated with correct answer information 110b. The correct answer information 110b is information that is assigned for each voice data and indicates whether or not a specific conversation situation is included in the voice data. In the first embodiment, as an example, the specific conversation situation is referred to as an "abnormal conversation situation." The abnormal conversation situation includes "unusual situations" where, for example, a customer feels dissatisfied, becomes irate, or threatens an operator.

The generation unit 120 acquires the learning voice data from the learning voice database 110a. In the following description of the learning device 100, the learning voice data acquired from the learning voice database is simply referred to as "voice data." The generation unit 120 performs phoneme recognition on the voice data to generate information of a maximum likelihood phoneme sequence. For example, the maximum likelihood phoneme sequence is a sequence of probabilistically plausible phonemes arranged in time series. The generation unit 120 converts each phoneme into a One Hot vector, and outputs the One Hot vector of each phoneme to the first calculation unit 130.

The first calculation unit 130 is a processing unit that calculates an internal vector by sequentially inputting the One Hot vector of each phoneme to a first network having a recursive path and performing a calculation based on a set of parameters of the first network. For example, the first network corresponds to an LSTM (Long Short Term Memory). The first calculation unit 130 inputs the One Hot vectors of all phonemes included in the voice data to the first network, and outputs each internal vector obtained as a result of the input to the third calculation unit 140.

The third calculation unit 140 is a processing unit that averages the plurality of internal vectors output from the first calculation unit 130. The third calculation unit 140 outputs the obtained average internal vector to the second calculation unit 150. In the following description, the obtained average internal vector is referred to as an "average vector."

The second calculation unit 150 is a processing unit that calculates an output value (neuron value) by inputting the average vector to a second network having no recursive path and performing a calculation based on a set of parameters of the second network. The second calculation unit 150 outputs the output value to the learning unit 160.

The learning unit 160 learns parameters of the first calculation unit 130 and parameters of the second calculation unit 150 such that when the voice data is input to the first calculation unit 130, the output value output from the second calculation unit 150 approaches the correct answer information 110b corresponding to the voice data (learning by an error back-propagation method).

The learning unit 160 repeatedly performs the error back-propagation learning until a learning stop condition is satisfied, to generate an LSTM model 110c and a DNN (Deep Neural Network) model 110d. The LSTM model 110c is information corresponding to the learned set of parameters of the first network. The DNN model 110d is information corresponding to the learned set of parameters of the second network. The learning device 100 notifies the determination device 200 of the information of the LSTM model 110c and the information of the DNN model 110d. In addition, the learning unit 160 may notify the determination device 200 of the information of the LSTM model 110c and the information of the DNN model 110d via a network, or the learning device 100 may be directly connected to the determination device 200 and then notify the determination device 200 of the information of the LSTM model 110c and the information of the DNN model 110d.

The determination device 200 includes a generation unit 220, a first calculation unit 230, a third calculation unit 240, a second calculation unit 250, and a determination unit 260.

The generation unit 220 receives input of voice data that is a target of detection as to whether or not an abnormal conversation situation exists. In the following description of the determination device 200, the voice data that is a target of detection as to whether or not an abnormal conversation situation exists is simply referred to as voice data. The generation unit 220 performs phoneme recognition on the voice data to generate information of a maximum likelihood phoneme sequence. The generation unit 220 converts each phoneme into a One Hot vector, and outputs the One Hot vector of each phoneme to the first calculation unit 230.

The first calculation unit 230 is a processing unit that calculates an internal vector by sequentially inputting the One Hot vector of each phoneme to a first network having a recursive path and performing a calculation based on a set of parameters of the first network. The first calculation unit 230 uses a set of parameters of the LSTM model 110c as the parameter to be set in the first network. The first calculation unit 230 inputs the One Hot vectors of all phonemes included in the voice data to the first network, and outputs each internal vector obtained as a result of the input to the third calculation unit 240.

The third calculation unit 240 is a processing unit that averages the plurality of internal vectors output from the first calculation unit 230. The third calculation unit 240 outputs the obtained average internal vector (average vector) to the second calculation unit 250.

The second calculation unit 250 is a processing unit that calculates an output value (neuron value) by inputting the average vector to a second network having no recursive path and performing a calculation based on a set of parameters of the second network. The second calculation unit 250 uses a set of parameters of the DNN model 110d as the parameter to be set in the second network. The second calculation unit 250 outputs the output value to the determination unit 260.

The determination unit 260 is a processing unit that compares the output value output from the second calculation unit 250 with a threshold value, and determines whether or not an abnormal conversation situation is included in the voice data. For example, when the output value is equal to or larger than the threshold value, the determination unit 260 determines that an abnormal conversation situation is included in the voice data.

As described above, the learning device 100 according to the first embodiment performs machine learning on the LSTM model 110c and the DNN model 110d using a set of a phoneme sequence extracted from learning voice data and correct answer information. Therefore, the LSTM model 110c and the DNN model 110d may be machine-learned without requiring trial and error, skilled knowledge, and know-how for setting keywords in order to detect a specific conversation situation. Further, the determination device 200 uses the learned LSTM model 110c and DNN model 110d to perform the processing on the voice data, so that it may be appropriately determined whether or not a specific conversation situation is included in the voice data.

For example, the reference technique described in FIG. 1 and the present disclosure described in FIG. 2 have been evaluated using conversation voice (voice data) between a customer and an operator which has been recorded in an actual call center. According to the result, the present disclosure not only eliminates a need for keyword presetting but also improves a detection rate and a false detection rate of a specific conversation situation by about twice, as compared to the reference technique. Since the phoneme sequences effective for detection may be exhaustively modeled by the machine learning, it is possible not only to eliminate a need for the keyword selecting work but also to obtain an optimal detection model.

Figure 3:
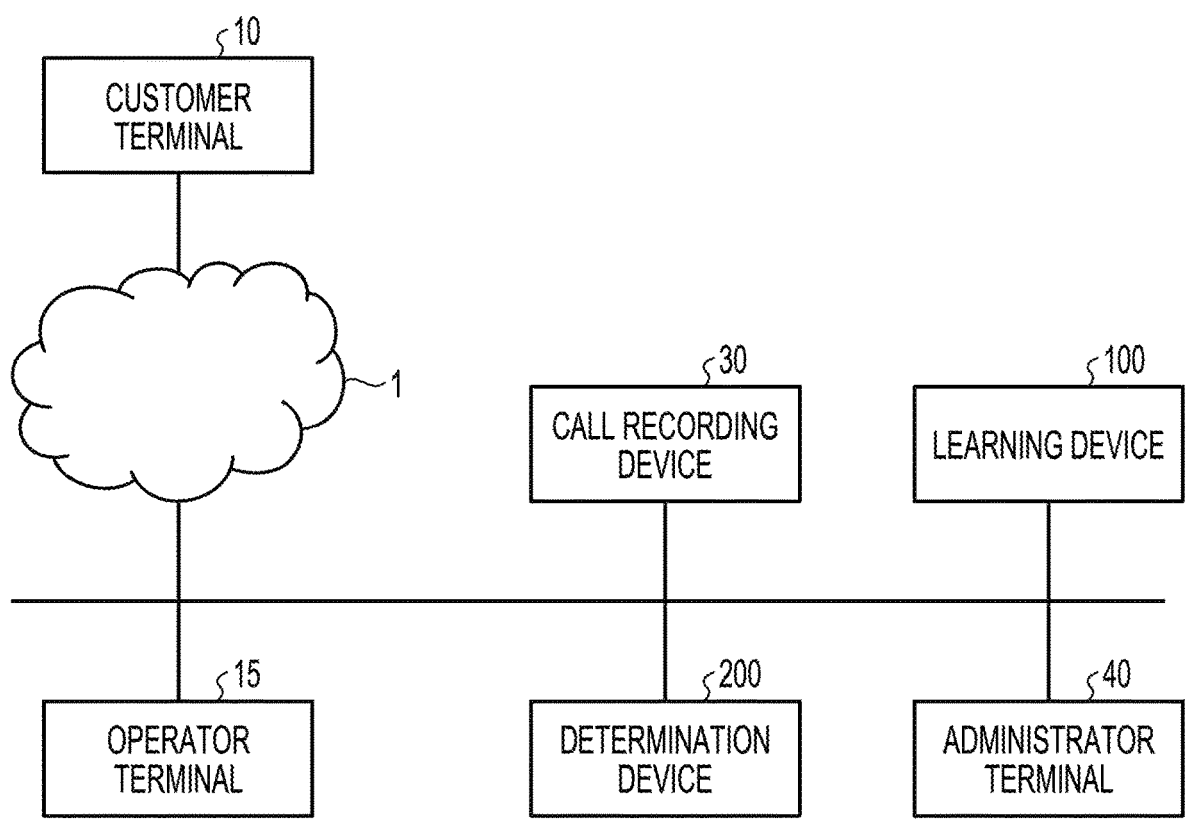
FIG. 3 is a view illustrating an example of a system according to the first embodiment.

Next, an example of a system according to the first embodiment will be described. FIG. 3 is a view illustrating an example of a system according to the first embodiment. As illustrated in FIG. 3, this system includes a customer terminal 10, an operator terminal 15, a call recording device 30, an administrator terminal 40, a learning device 100, and a determination device 200.

The customer terminal 10 and the operator terminal 15 are interconnected via a network 1 such as an IP (Internet Protocol) network. In addition, the operator terminal 15, the call recording device 30, the administrator terminal 40, the learning device 100, and the determination device 200 are interconnected via a predetermined network.

The customer terminal 10 is a terminal device used by a customer to converse (call) with an operator. The operator terminal 15 is a terminal device used by an operator to converse with a customer.

The call recording device 30 is a device that records voice of conversations exchanged between the customer terminal 10 and the operator terminal 15. In learning, voice data recorded by the call recording device 30 is notified to the learning device 100 and used as learning voice data. In detecting an abnormal conversation, the voice data recorded by the call recording device 30 is notified to the determination device 200 in which it is determined whether or not an abnormal conversation situation is included in the voice data.

The administrator terminal 40 is a terminal device used by an administrator to manage an operator who converses with a customer using the operator terminal 15. For example, when the determination device 200 determines that an abnormal conversation situation is included in the conversation between the customer and the operator, the determination device notifies the administrator terminal 40 of information indicating that the abnormal conversation situation has been detected.

The learning device 100 is a device that learns the LSTM model 110c and the DNN model 110d, using the learning voice data and the correct answer information. The learning device 100 notifies the determination device 200 of information of the learned LSTM model 110c and DNN model 110d.

The determination device 200 is a device that determines whether or not an abnormal conversation situation is included in the conversation between the customer terminal 10 and the operator terminal 15, using the LSTM model 110c and the DNN model 110d that are notified from the learning device 100. When it is determined that an abnormal conversation situation is included in the conversation between the customer and the operator, the determination device 200 notifies the administrator terminal 40 of information indicating that the abnormal conversation situation has been detected.

Figure 4:
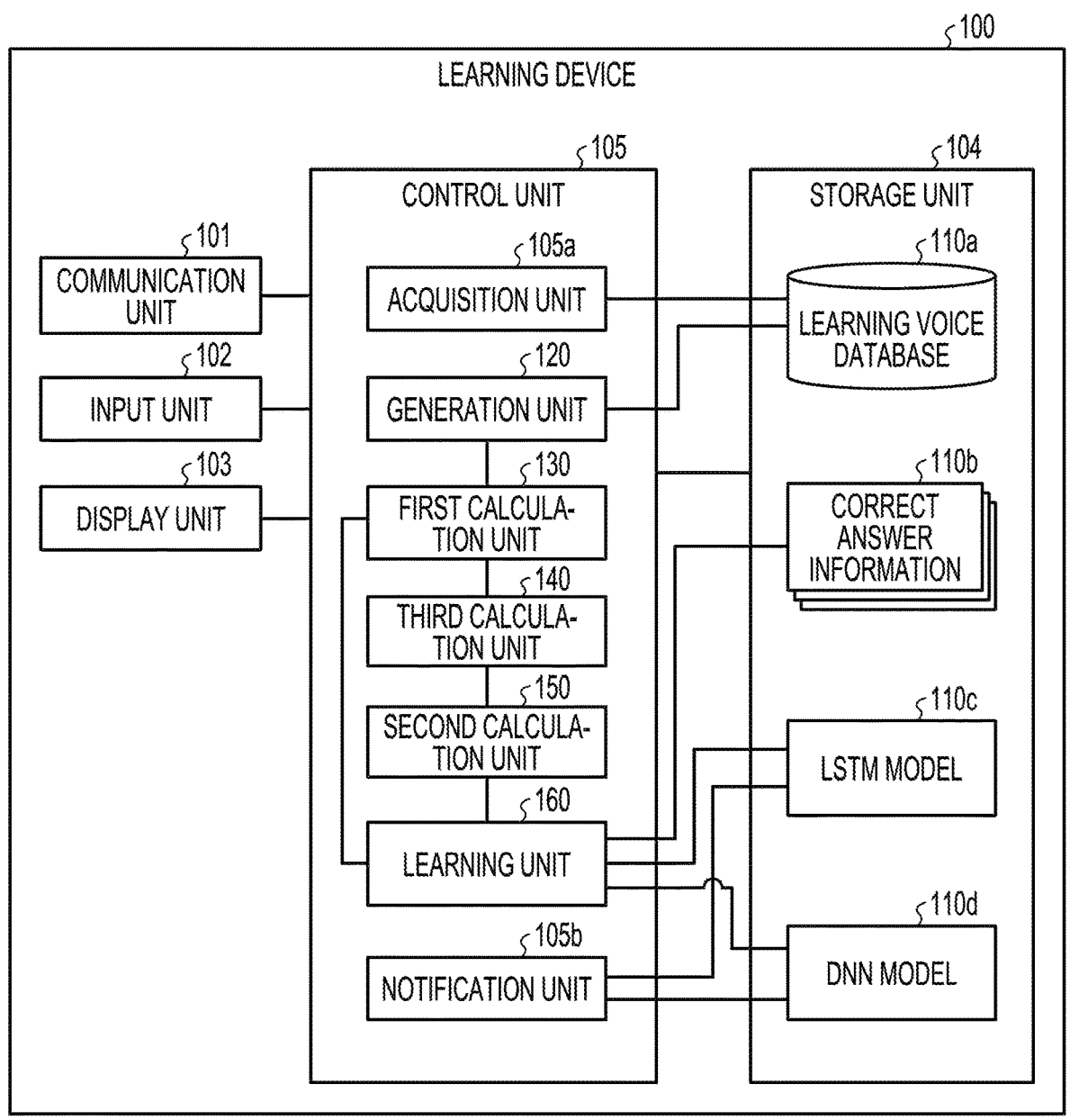
FIG. 4 is a functional block diagram illustrating the configuration of the learning device according to the first embodiment.

Next, an example of the configuration of the learning device 100 illustrated in FIG. 3 will be described. FIG. 4 is a functional block diagram illustrating the configuration of the learning device according to the first embodiment. As illustrated in FIG. 4, the learning device 100 includes a communication unit 101, an input unit 102, a display unit 103, a storage unit 104, and a control unit 105.

The communication unit 101 is a processing unit that performs a data communication with the call recording device 30 and the determination device 200. The control unit 105 to be described later exchanges data with the call recording device 30 and the determination device 200 via the communication unit 101. The communication unit 101 is an example of a communication device.

The input unit 102 is an input device for inputting various types of information to the learning device 100. The input unit 102 corresponds to a keyboard, a mouse, a touch panel or the like.

The display unit 103 is a device that displays information output from the control unit 105. The display unit 103 corresponds to a liquid crystal display, a touch panel or the like.

The storage unit 104 includes a learning voice database 110a, correct answer information 110b, an LSTM model 110c, and a DNN model 110d. The storage unit 104 corresponds to a semiconductor memory device such as a RAM (Random Access Memory), a flash memory or the like, or a storage device such as an HDD (Hard Disk Drive) or the like.

The learning voice database 110a is a database that stores a plurality of learning voice data. Each voice data stored in the learning voice database 110a is voice data of a conversation between a customer and an operator.

The correct answer information 110b is information that is assigned to each voice data stored in the learning voice database 110a and indicates whether or not an abnormal conversation situation is included in the voice data.

The LSTM model 110c is information corresponding to the set of parameters of the first network (LSTM). The DNN model 110d is information corresponding to the set of parameters of the second network (DNN). The LSTM model 110c and the DNN model 110d are machine-learned by the learning unit 160.

The control unit 105 includes an acquisition unit 105a, a notification unit 105b, a generation unit 120, a first calculation unit 130, a third calculation unit 140, a second calculation unit 150, and a learning unit 160. The control unit 105 may be implemented by a CPU (Central Processing Unit), an MPU (Micro Processing Unit) or the like. The control unit 105 may also be implemented by a hard-wired logic such as an ASIC (Application Specific Integrated Circuit), an FPGA (Field Programmable Gate Array) or the like.

The acquisition unit 105a is a processing unit that acquires information of the learning voice database 110a from the call recording device 30. The acquisition unit 105a stores the information of the learning voice database 110a in the storage unit 104. In addition, when the correct answer information 110b is acquired, the acquisition unit 105a stores the acquired correct answer information 110b in the storage unit 104. The correct answer information 110b may be associated in advance with each voice data in the learning voice database 110a.

The notification unit 105b is a processing unit that notifies the determination device 200 of the learned LSTM model 110c and the learned DNN model 110d.

Figure 5:
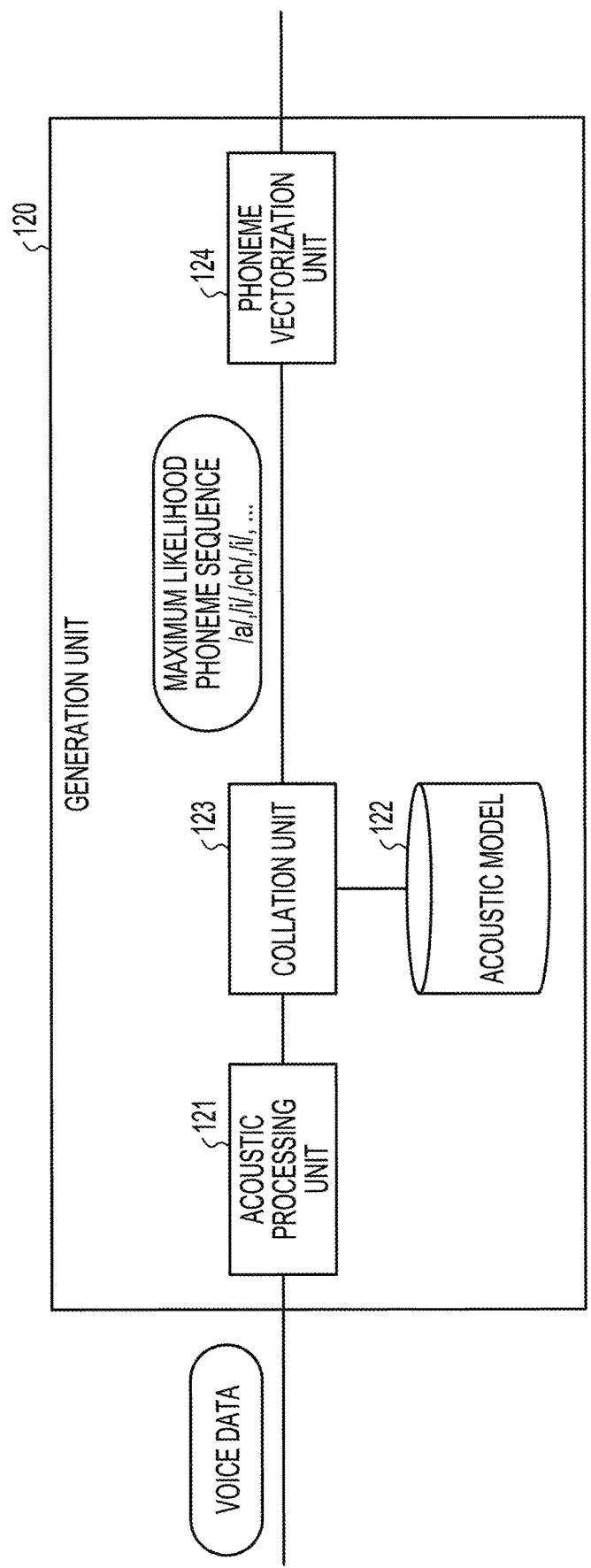
FIG. 5 is a view for explaining a generation unit according to the first embodiment.

The generation unit 120 is a processing unit that acquires the learning voice data from the learning voice database 110a and generates information of a maximum likelihood phoneme sequence based on the learning voice data. FIG. 5 is a view for explaining the generation unit according to the first embodiment. As illustrated in FIG. 5, the generation unit 120 includes an acoustic processing unit 121, an acoustic model 122, a collation unit 123, and a phoneme vectorization unit 124.

The acoustic processing unit 121 is a processing unit that extracts information to be used for voice recognition from the voice data. The information extracted from the voice data is called a feature amount. The acoustic processing unit 121 sets a short section, called a frame, of about 32 ms in the voice data, and extracts a feature amount while shifting the short section by about 10 ms. For example, the acoustic processing unit 121 extracts a feature amount from the voice data based on MFCC (Mel-Frequency Cepstrum Coefficients). The acoustic processing unit 121 outputs the feature amount to the collation unit 123.

The acoustic model 122 is a model for obtaining phoneme likeliness of the feature amount extracted from the voice data. The acoustic model 122 is learned in advance based on a large amount of learning voice data in which correct answer labels of phonemes are attached to a voice waveform.

The collation unit 123 is a processing unit that inputs the feature amount to the acoustic model 122 and performs a process of collating a phoneme corresponding to the feature amount based on phoneme likeliness output from the acoustic model 122 each time the feature amount is received from the acoustic processing unit 121. The collation unit 123 outputs to the phoneme vectorization unit 124 the information of the maximum likelihood phoneme sequence in which phonemes corresponding to each feature amount are arranged in time series.

The phoneme vectorization unit 124 is a processing unit that converts each phoneme included in the maximum likelihood phoneme sequence into a vector. The phoneme vectorization unit outputs each vector corresponding to each phoneme of the maximum likelihood phoneme sequence to the first calculation unit 130. For example, the phoneme vectorization unit 124 represents each phoneme by a 40-dimensional One Hot vector. For the One Hot vector of an input phoneme, "1" is set in the dimension of the input phoneme, and "0" is set in the other dimensions.

Figure 6:
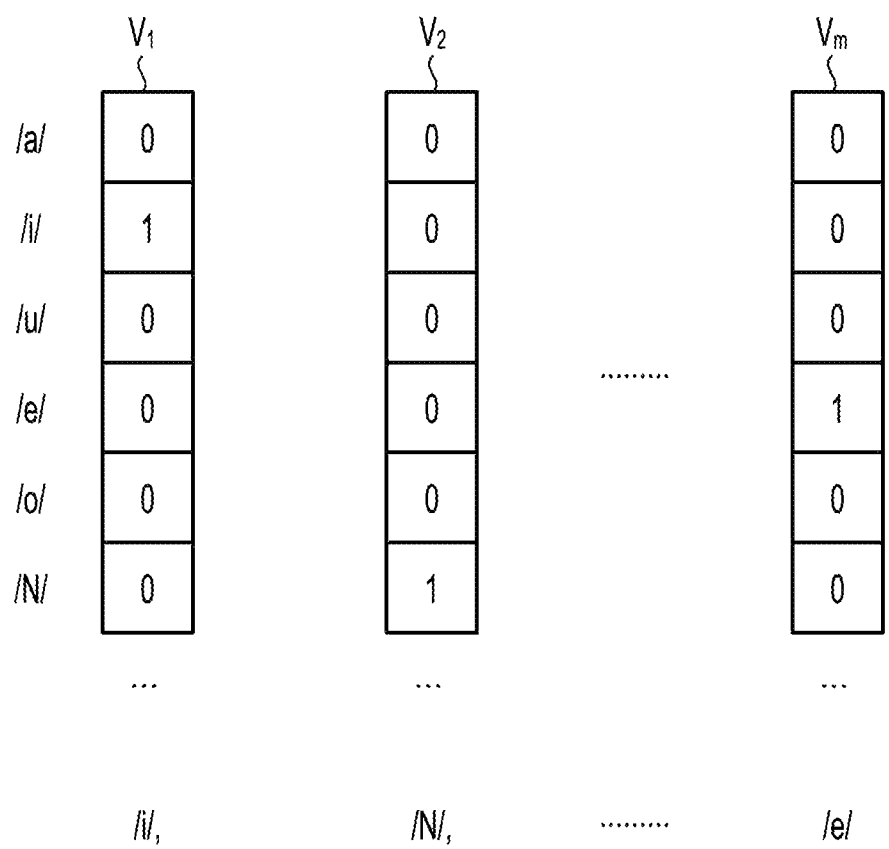
FIG. 6 is a view for explaining processing of a phoneme vectorization unit according to the first embodiment.

FIG. 6 is a view for explaining the processing of the phoneme vectorization unit according to the first embodiment. For example, when the phonemes "/i/", "/N/", . . . , "/e/" are input in this order, the phoneme vectorization unit 124 generates One Hot vectors $v_1, v_2, \ldots, v_m$. For the One Hot vector $v_1$, "1" is set in the dimension corresponding to the phoneme "/i/", and "0" is set in the other dimensions. For the One Hot vector $v_2$, "1" is set in the dimension corresponding to the phoneme "/N/", and "0" is set in the other dimensions. For the One Hot vector $v_m$, "1" is set in the dimension corresponding to the phoneme "/e/", and "0" is set in the other dimensions.

Referring back to FIG. 4, the first calculation unit 130 is a processing unit that calculates an internal vector by sequentially inputting the One Hot vector of each phoneme to the first network having a recursive path and performing a calculation based on the set of parameters of the first network.

Figure 7:
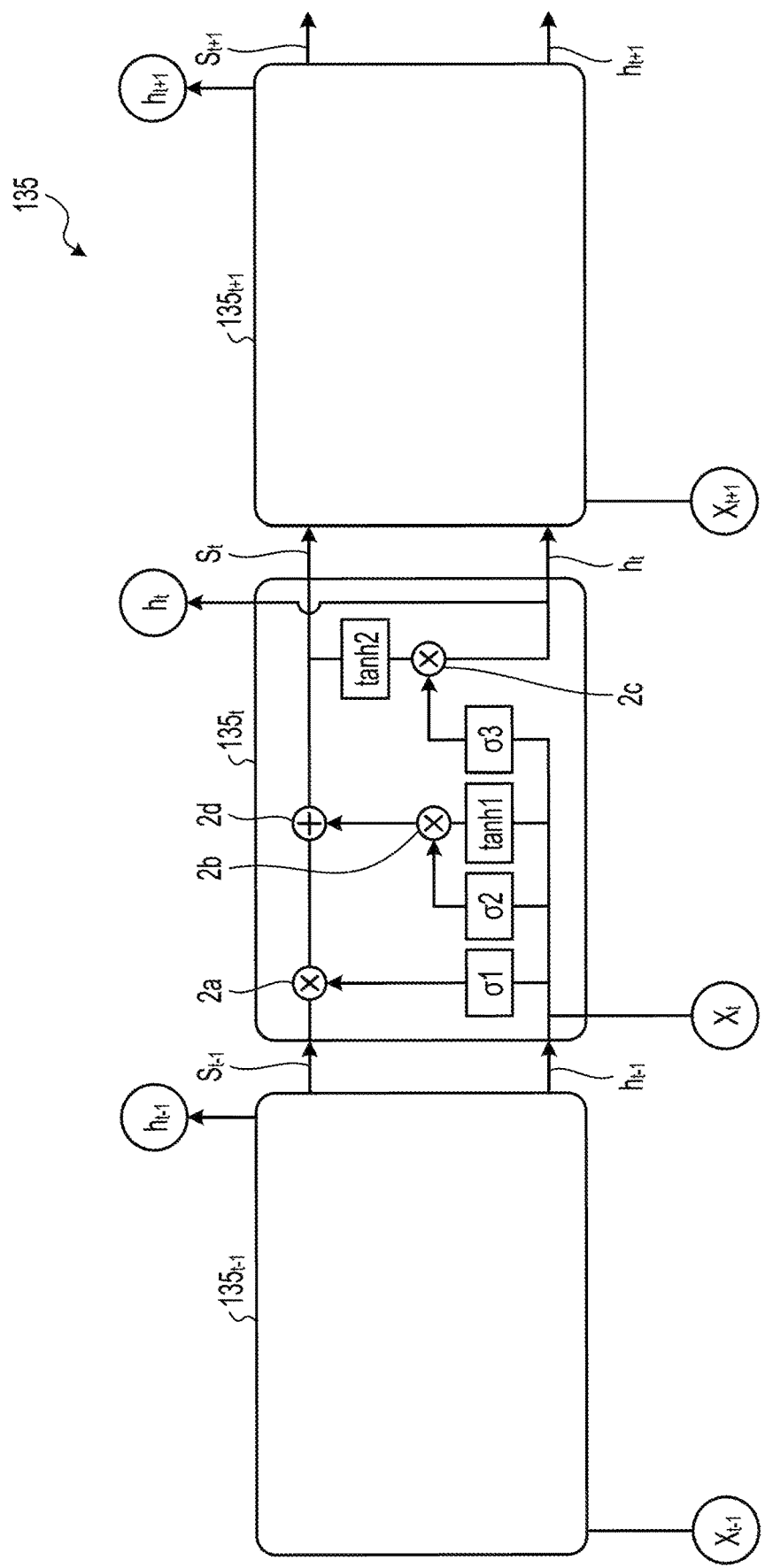
FIG. 7 is a view illustrating an example of an LSTM according to the first embodiment.

The first calculation unit 130 uses an LSTM as the first network. FIG. 7 is a view illustrating an example of the LSTM according to the first embodiment. Each LSTM 135 has three sets of weight matrices and biases (corresponding to three connected one-layer feed-forward-type neural networks). A weight matrix and a bias value are parameters of a learning target of the LSTM 135.

The LSTM 135 includes σ1, σ2, and σ3, switches 2a, 2b, and 2c, an addition unit 2d, tanh1, and tanh2. The σ1 to σ3 are processing units that perform the affine transformation by multiplying an input vector and a weight matrix, and outputs a vector obtained by the affine transformation. The switches 2a to 2c are processing units that control the ON/OFF for each dimension of a vector that is input and passes through a gate, according to the value of each dimension of the input vector. For example, the switches 2a to 2c control the ON/OFF based on a sigmoid function or the like. The addition unit 2d is a processing unit that outputs a value obtained by adding vectors input from two directions for each dimension. The tanh1 and tanh2 are processing units that perform a calculation based on a tanh function for the input vector and output the calculation result.

In FIG. 7, "$X_t$" represents a One Hot vector of a phoneme at time "t". For the sake of convenience, the LSTM 135 at the time when a One Hot vector "$X_{t-1}$" of the phoneme is input at time t−1 is denoted as an LSTM $135_{t-1}$. The LSTM 135 at the time when the One Hot vector "$X_t$" of the phoneme is input at time "t" is denoted as an LSTM $135_t$. The LSTM 135 at the time when a One Hot vector "$X_{t+1}$" of the phoneme is input at time t+1 is denoted as an LSTM $135_{t+1}$.

As an example, description will be made using the LSTM $135_t$ as an example. When "$X_t$" is input, a vector obtained by connecting $h_{t-1}$ input from the LSTM $135_{t-1}$ and $X_t$ is input to σ1, σ2, and σ3, and tanh1. The $h_{t-1}$ is an internal vector calculated by the LSTM 135 at time t−1.

The switch 2a controls the ON/OFF of a gate through which $S_{t-1}$ passes, based on a vector output from σ1. The switch 2b controls the ON/OFF of a gate through which a vector output from tanh1 passes, based on a vector output from σ2. The switch 2c controls the ON/OFF of a gate through which a vector $S_t$ output from the addition unit 2d passes, based on a vector output from σ3. A vector output from the switch 2c is an internal vector $h_t$ at time "t". The internal vector $h_t$ is input to the LSTM $135_{t+1}$.

The addition unit 2d is a processing unit that calculates a vector $S_t$ by adding the vector output from the switch 2a and the vector output from the switch 2b. The vector $S_t$ is input to both the LSTM $135_t$ and tanh2.

The first calculation unit 130 calculates a plurality of internal vectors "h" by sequentially inputting the One Hot vectors of all phonemes included in the maximum likelihood phoneme sequence to the LSTM 135 described with reference to FIG. 7. The first calculation unit 130 outputs the plurality of internal vectors "h" to the third calculation unit 140.

The third calculation unit 140 is a processing unit that averages the plurality of internal vectors "h" output from the first calculation unit 130. The third calculation unit 140 outputs the obtained average internal vector (average vector) to the second calculation unit 150.

The second calculation unit 150 is a processing unit that calculates output values (neuron values) by inputting the average vector to a second network having no recursive path and performing a calculation based on a set of parameters of the second network.

Figure 8:
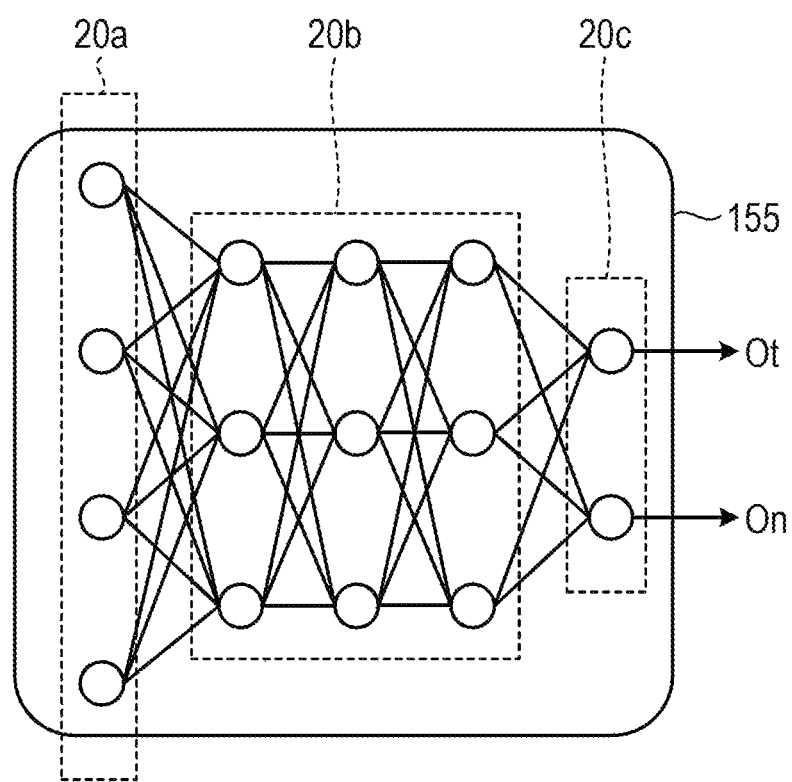
FIG. 8 is a view for explaining an example of a neural network according to the first embodiment.

For example, the second network is a feed-forward-type neural network. FIG. 8 is a view for explaining an example of a neural network according to the first embodiment. As illustrated in FIG. 8, the neural network 155 includes an input layer 20a, a hidden layer 20b, and an output layer 20c. The input layer 20a, the hidden layer 20b, and the output layer 20c have a structure in which a plurality of nodes are connected to each other at edges. The hidden layer 20b and the output layer 20c have a function called an activation function and a bias value, and each edge has a weight. The bias value and the weight are parameters which are learning targets of the second network.

When the average vector is input to each node included in the input layer 20a, a probability "Ot" that a conversation is in an abnormal conversation situation and a probability "On" that the conversation is in a normal conversation situation are output from each node of the output layer 20c through the hidden layer 20b. For example, the output layer 20c calculates probabilistic values by means of the Softmax, and the sum of the output value of "Ot" and the output value of "On" becomes "1.0".

Referring back to FIG. 4, the learning unit 160 is a processing unit that learns the parameters of the first calculation unit 130 and the parameters of the second calculation unit 150 such that when the One Hot vector of each phoneme generated from the voice data is input to the first calculation unit 130, the output value output from the second calculation unit 150 via the third calculation unit 140 approaches the correct answer information 110b corresponding to the voice data.

For example, in a case where the One Hot vector of each phoneme generated from the voice data corresponding to the correct answer information "abnormal conversation state" is input to the first calculation unit 130, the learning unit 160 learns the parameters such that the probability "Ot" approaches "1" and the probability "On" approaches "0". In a case where the One Hot vector of each phoneme generated from the voice data corresponding to the correct answer information "normal conversation state" is input to the first calculation unit 130, the learning unit 160 learns the parameters such that the probability "Ot" approaches "0" and the probability "On" approaches "1".

The learning unit 160 uses, for example, the Cross Entropy as a loss function including a difference between the value output from Ot and a correct answer value and a difference between the value output from On and the correct answer value. The learning unit 160 repeatedly performs the parameter learning such that the value of the loss function becomes the minimum value by back-propagating an error of the loss function. The learning unit 160 sets a learning stop condition, and ends the parameter learning when the learning stop condition is satisfied. For example, the learning stop condition is a condition that the value of the loss function be less than a threshold value.

The learning unit 160 stores information of the result of the parameter learning of the LSTM 135 in the storage unit 104 as the LSTM model 110c. The learning unit 160 stores information of the result of the parameter learning of the neural network 155 in the storage unit 104 as the DNN model 110d.

Figure 9:
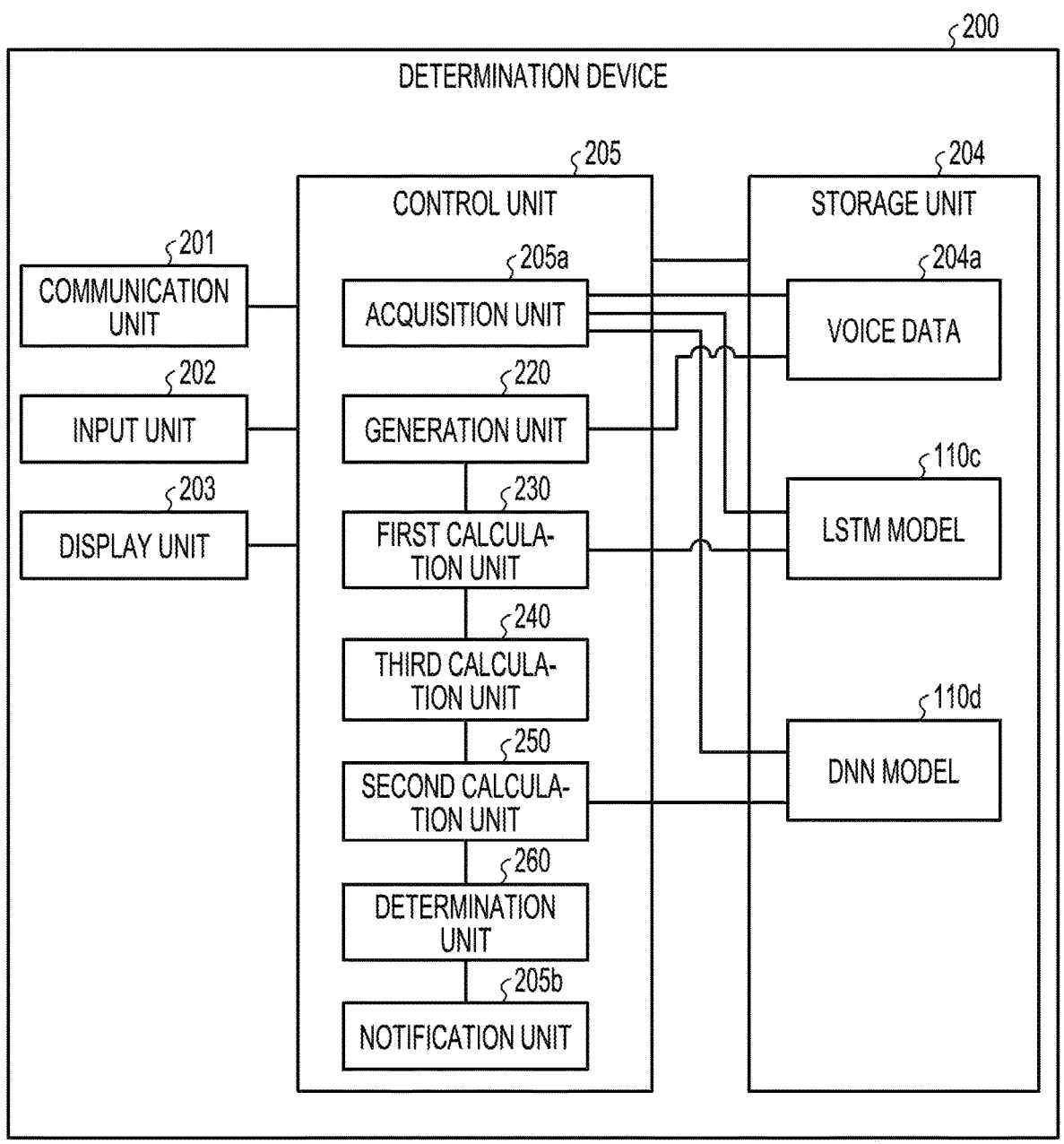
FIG. 9 is a functional block diagram illustrating the configuration of the determination device according to the first embodiment.

Next, an example of the configuration of the determination device 200 illustrated in FIG. 3 will be described. FIG. 9 is a functional block diagram illustrating the configuration of the determination device according to the first embodiment. As illustrated in FIG. 9, the determination device 200 includes a communication unit 201, an input unit 202, a display unit 203, a storage unit 204, and a control unit 205. Although not illustrated, the determination device 200 may be connected to a microphone for acquiring voice data.

The communication unit 201 is a processing unit that performs a data communication with the call recording device 30 and the learning device 100. The control unit 205 to be described later exchanges data with the call recording device 30 and the learning device 100 via the communication unit 201. The communication unit 201 is an example of a communication device.

The input unit 202 is an input device for inputting various types of information to the determination device 200. The input unit 202 corresponds to a keyboard, a mouse, a touch panel or the like.

The display unit 203 is a device that displays information output from the control unit 205. The display unit 203 corresponds to a liquid crystal display, a touch panel or the like.

The storage unit 204 stores voice data 204a, an LSTM model 110c, and a DNN model 110d. The storage unit 204 corresponds to a semiconductor memory device such as a RAM or a flash memory, or a storage device such as an HDD.

The voice data 204a is voice data of a conversation between a customer and an operator, which is recorded by the call recording device 30, and is voice data that is a detection target of an abnormal conversation situation.

The LSTM model 110c is information corresponding to the set of parameters of the first network (LSTM 135) learned by the learning device 100.

The DNN model 110d is information corresponding to the set of parameters of the second network (neural network 155) learned by the learning device 100.

The control unit 205 includes an acquisition unit 205a, a notification unit 205b, a generation unit 220, a first calculation unit 230, a third calculation unit 240, a second calculation unit 250, and a determination unit 260. The control unit 205 may be implemented by a CPU, an MPU or the like. The control unit 205 may also be implemented by a hard-wired logic such as an ASIC, an FPGA or the like.

The acquisition unit 205a is a processing unit that acquires the voice data 204a from the call recording device 30. The acquisition unit 205a stores the voice data 204a in the storage unit 204. In addition, the acquisition unit 205a acquires information of the learned LSTM model 110c and information of the DNN model 110d from the learning device 100. The acquisition unit 205a stores information of the LSTM model 110c and information of the DNN model 110d in the storage unit 204.

The notification unit 205b acquires a determination result from the determination unit 260 to be described later. When the determination unit 260 determines that an abnormal conversation situation is included in the voice data 204a, the notification unit 205b notifies the administrator terminal 40 of information indicating that the abnormal conversation situation is included in the voice data 204a.

The generation unit 220 is a processing unit that acquires the voice data 204a and generates information of a maximum likelihood phoneme sequence based on the voice data 204a. Similarly to the generation unit 120 of the learning device 100, the generation unit 220 generates the maximum likelihood phoneme sequence from the voice data 204a and generates a One Hot vector of each phoneme. The generation unit 220 outputs the One Hot vector of each phoneme to the first calculation unit 230.

The first calculation unit 230 is a processing unit that calculates an internal vector by sequentially inputting the One Hot vector of each phoneme to the first network having a recursive path and performing a calculation based on the set of parameters of the first network. The first network used by the first calculation unit 230 corresponds to the LSTM 135 described with reference to FIG. 7. The first calculation unit 230 sets parameters of the LSTM model 110c as the parameter of the LSTM 135 and calculates the internal vector. The first calculation unit 230 outputs an internal vector "h" calculated from the One Hot vector of each phoneme to the second calculation unit 250.

The third calculation unit 240 is a processing unit that averages a plurality of internal vectors "h" output from the first calculation unit 230. The third calculation unit 240 outputs the obtained average internal vector (average vector) to the second calculation unit 250.

The second calculation unit 250 is a processing unit that calculates an output value (neuron value) by inputting the average vector to the second network having no recursive path and performing a calculation based on a set of parameters of the second network. The second network used by the second calculation unit 250 corresponds to the neural network 155 described with reference to FIG. 8. The second calculation unit 250 sets parameters of the DNN model 110d as the parameter of the neural network 155 and calculates a probability "Ot" that a conversation is in an abnormal conversation situation and a probability "On" that the conversation is in a normal conversation situation. The second calculation unit 250 outputs information of the probability "Ot" to the determination unit 260.

The determination unit 260 is a processing unit that determines whether or not an abnormal conversation situation is included in the voice data 204a based on the probability "Ot" that the conversation is in the abnormal conversation situation. For example, when the probability Ot is equal to or larger than a preset threshold value, the determination unit 260 determines that an abnormal conversation situation is included in the voice data 204a. The determination unit 260 outputs the determination result to the notification unit 205b. In this example, the determination is performed based on the probability "Ot" that the conversation is in the abnormal conversation situation. However, the determination may be performed based on a difference or ratio between the probability "Ot" and the probability "On" that the conversation is in the normal conversation situation.

Figure 10:
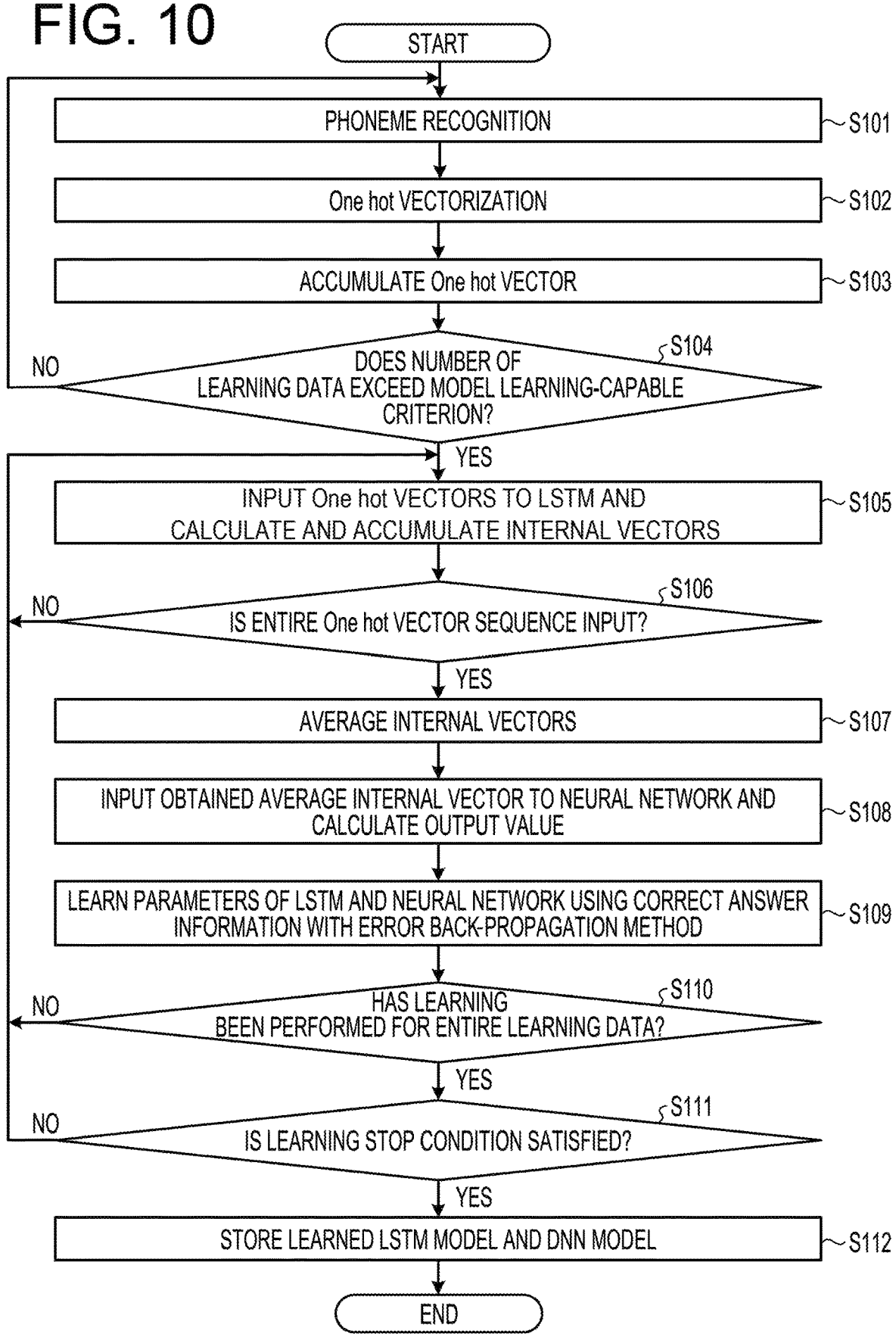
FIG. 10 is a flowchart illustrating a processing procedure of the learning device according to the first embodiment.

Next, an example of a processing procedure of the learning device 100 according to the first embodiment will be described. FIG. 10 is a flowchart illustrating a processing procedure of the learning device according to the first embodiment. As illustrated in FIG. 10, the generation unit 120 of the learning device 100 acquires learning voice data and performs phoneme recognition (step S101). The generation unit 120 converts a phoneme into a One Hot vector (step S102). The generation unit 120 accumulates One Hot vectors (step S103).

When the number of learning data (the number of One Hot vectors) does not exceed a model learning-capable criterion (No in step S104), the generation unit 120 returns to step S101. Meanwhile, when the number of learning data exceeds the model learning-capable criterion (Yes in step S104), the generation unit 120 proceeds to step S105.

The first calculation unit 130 of the learning device 100 inputs the One Hot vectors to the LSTM 135 and calculates and accumulates internal vectors (step S105). When the entire One Hot vector sequence is not input (No in step S106), the first calculation unit 130 proceeds to step S105. Meanwhile, when the entire One Hot vector sequence is input (Yes in step S106), the first calculation unit 130 proceeds to step S107. The third calculation unit 140 of the learning device 100 averages the internal vectors (step S107).

The second calculation unit 150 of the learning device 100 inputs the obtained average internal vector to the neural network 155 and calculates an output value (step S108). The learning unit 160 of the learning device 100 uses the correct answer information 110b to learn the parameters of the LSTM 135 and the neural network 155 by the error back-propagation method (step S109).

When the learning unit 160 has not learned all the learning data (No in step S110), the learning unit 160 proceeds to step S105. When the learning unit 160 has learned all the learning data (Yes in step S110), the learning unit 160 proceeds to step S111.

When the learning stop condition is not satisfied (No in step S111), the learning unit 160 changes the order of the learning data at random and then proceeds to step S105. When the learning stop condition is satisfied (Yes in step S111), the learning unit 160 proceeds to step S112. The learning unit 160 stores the learned LSTM model 110c and DNN model 110d in the storage unit 104 (step S112).

Figure 11:
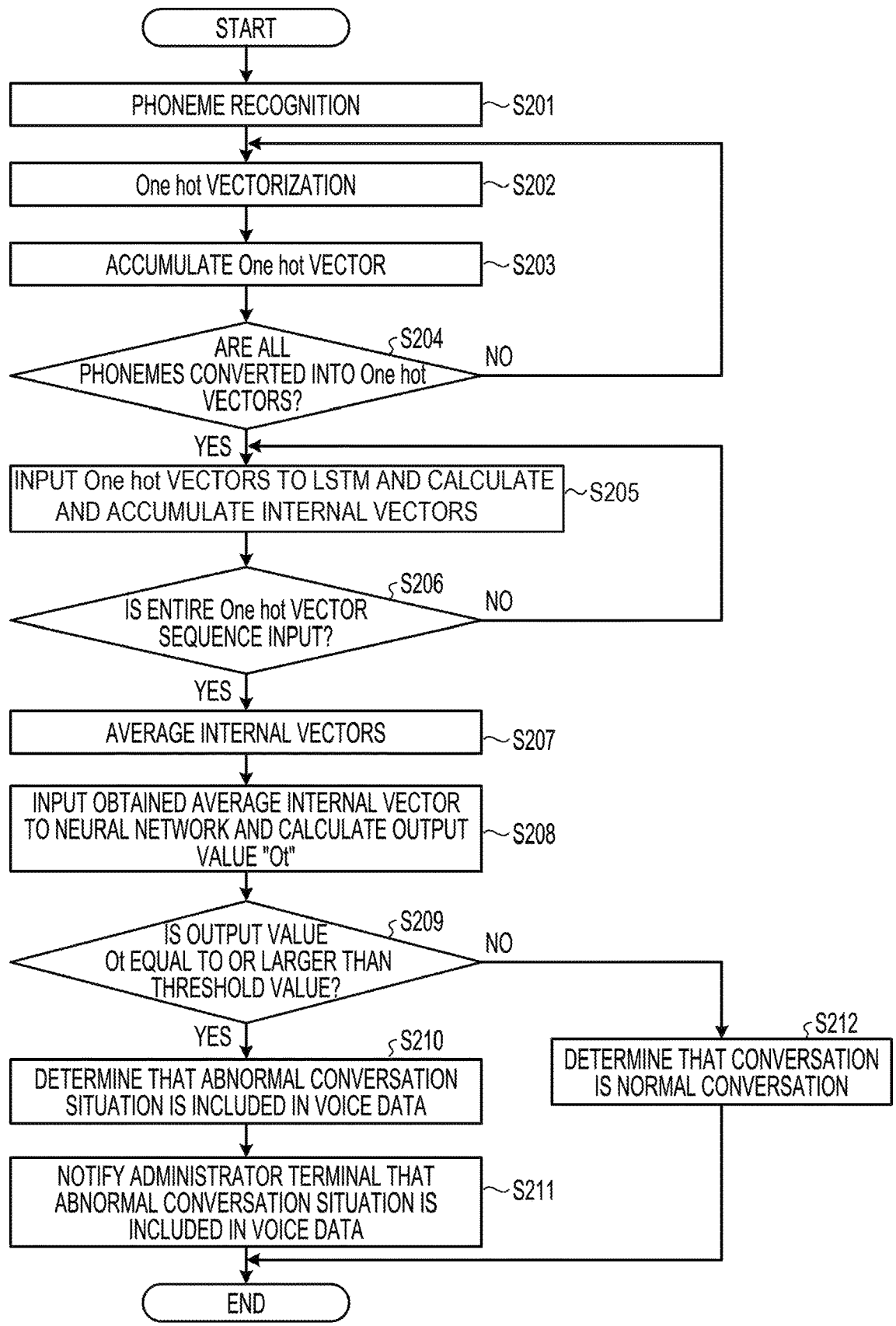
FIG. 11 is a flowchart illustrating a processing procedure of the determination device according to the first embodiment.

Next, an example of a processing procedure of the determination device 200 according to the first embodiment will be described. FIG. 11 is a flowchart illustrating a processing procedure of the determination device according to the first embodiment. As illustrated in FIG. 11, the generation unit 220 of the determination device 200 performs phoneme recognition (step S201) and converts a phoneme into a One Hot vector (step S202). The generation unit 220 accumulates the One Hot vector (step S203). When all phonemes have not been converted into One Hot vectors (No in step S204), the generation unit 220 proceeds to step S202. Meanwhile, when all phonemes have been converted into One Hot vectors (Yes in step S204), the generation unit 220 proceeds to step S205.

The first calculation unit 230 of the determination device 200 inputs the One Hot vectors to the LSTM 135, and calculates and accumulates internal vectors (step S205). In addition, the first calculation unit 230 uses the LSTM 135 based on the learned LSTM model 110c to calculate the internal vectors. When the entire One Hot vector sequence is not input (No in step S206), the first calculation unit 230 proceeds to step S205. When the entire One Hot vector sequence is input (Yes in step S206), the first calculation unit 230 proceeds to step S207.

The third calculation unit 240 of the determination device 200 averages the internal vectors (step S207). The second calculation unit 250 of the determination device 200 inputs the obtained average internal vector to the neural network 155 and calculates an output value "Ot" (step S208). In addition, the second calculation unit 250 uses the neural network 155 based on the learned DNN model 110d to calculate the output value. The output value "Ot" represents a probability that a conversation is in an abnormal conversation situation.

The determination unit 260 of the determination device 200 determines whether or not the output value Ot is equal to or larger than a threshold value (step S209). When the output value Ot is equal to or larger than the threshold value (Yes in step S209), the determination unit 260 determines that an abnormal conversation situation is included in the voice data 204a (step S210). The notification unit 205b of the determination device 200 notifies the administrator terminal 40 that an abnormal conversation situation is included in the voice data 204a (step S211).

Meanwhile, when the output value Ot is smaller than the threshold value (No in step S209), the determination unit 260 determines that the conversation is a normal conversation (step S212).

Next, the effects of the learning device 100 according to the first embodiment will be described. The learning device 100 performs machine learning on the LSTM model 110c and the DNN model 110d using a set of a phoneme sequence extracted from learning voice data, and correct answer information. Therefore, the LSTM model 110c and the DNN model 110d may be machine-learned without requiring trial and error, skilled knowledge, and know-how for setting keywords in order to detect a specific conversation situation. Further, the determination device 200 uses the learned LSTM model 110c and DNN model 110d to perform the processing on the voice data, so that it may be appropriately determined whether or not a specific conversation situation is included in the voice data.

Figure 12:
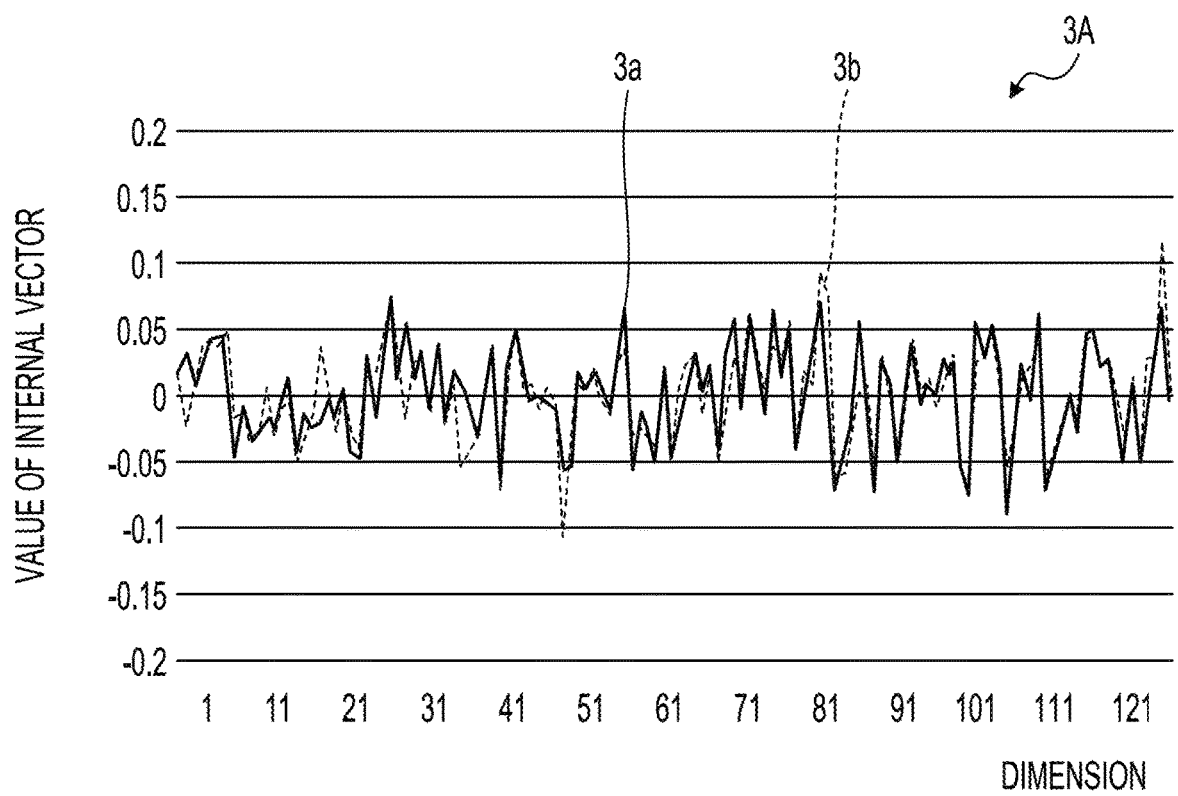
FIG. 12 is a view illustrating an example of an internal vector of voice data including an abnormal conversation situation.

FIG. 12 is a view illustrating an example of an internal vector of voice data including an abnormal conversation situation. In a graph 3A of FIG. 12, the vertical axis represents the value of an internal vector, and the horizontal axis represents the dimension of the internal vector. A line segment 3a indicates an internal vector of voice data of a first call including an abnormal conversation situation. A line segment 3b indicates an internal vector of voice data of a second call including an abnormal conversation situation. As illustrated in FIG. 12, even different calls in an abnormal state have almost the same internal vector shape.

Figure 13:
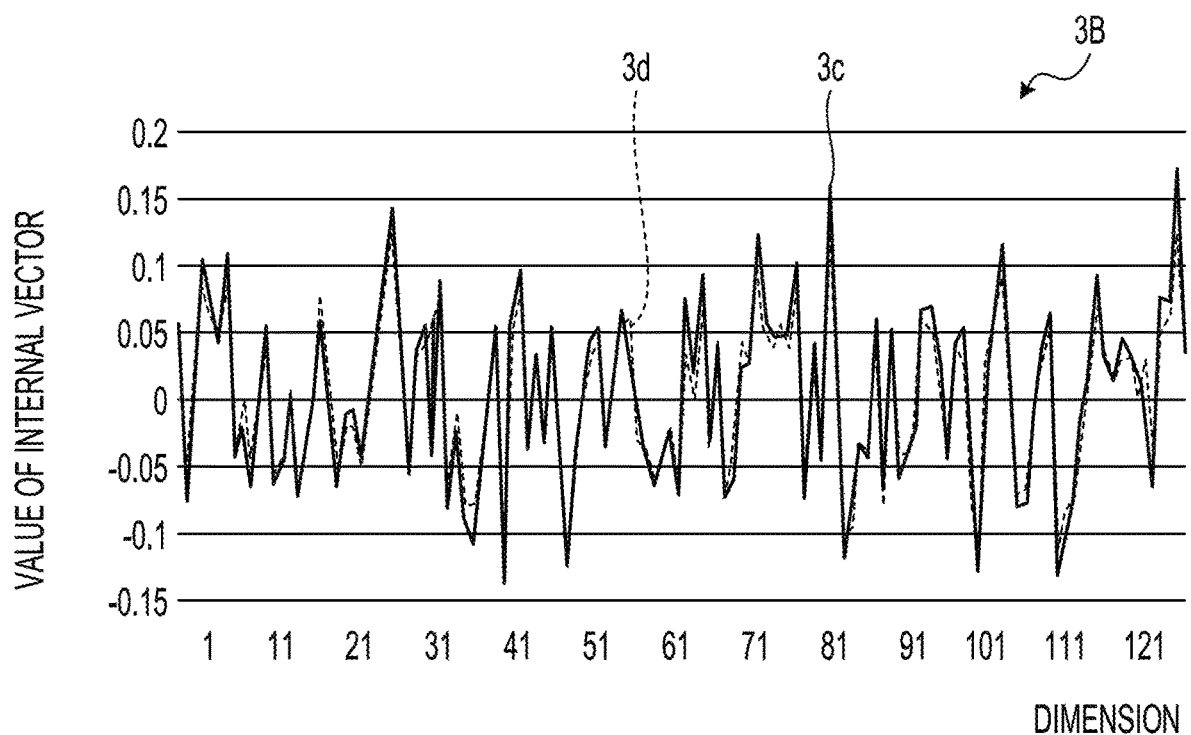
FIG. 13 is a view illustrating an example of an internal vector of voice data of a normal conversation.

FIG. 13 is a view illustrating an example of an internal vector of voice data of a normal conversation. In a graph 3B of FIG. 13, the vertical axis represents the value of an internal vector, and the horizontal axis represents the dimension of the internal vector. A line segment 3c indicates an internal vector of voice data of a normal third call. A line segment 3d indicates an internal vector of voice data of a normal fourth call. Even different calls in a normal state have almost the same internal vector shape.

The vector shape of the voice data of the abnormal conversation situation illustrated in FIG. 12 is greatly different from the vector shape of the voice data of the normal call illustrated in FIG. 13. Therefore, it is possible to determine whether or not an abnormal conversation situation is included in voice data, using internal vectors without setting keywords. Therefore, the LSTM model 110c and the DNN model 110d may be appropriately learned.

Second Embodiment

Figure 14:
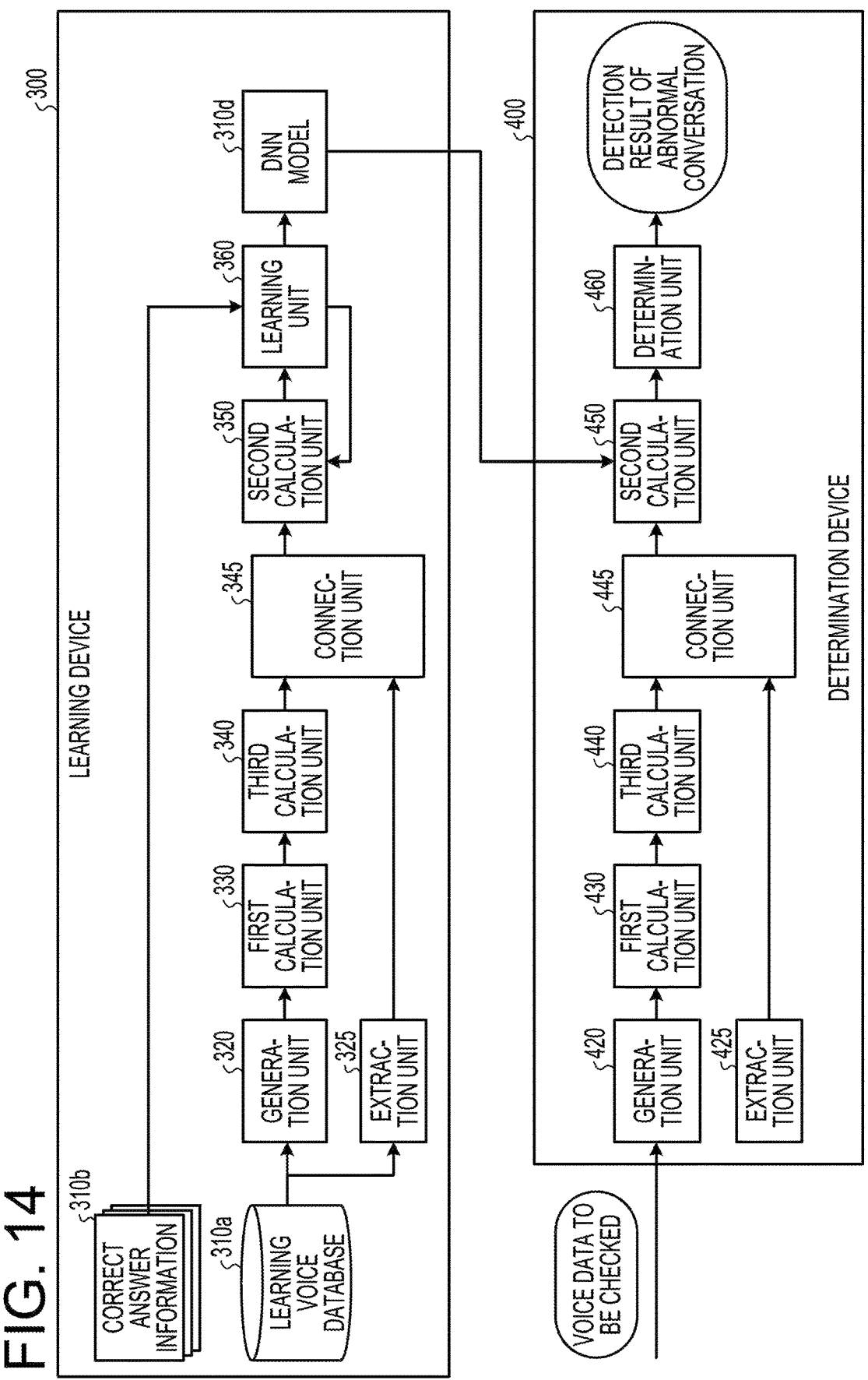
FIG. 14 is a view for explaining an example of processing of a learning device and a determination device according to a second embodiment.

FIG. 14 is a view for explaining an example of processing of a learning device and a determination device according to a second embodiment. As illustrated in FIG. 14, the learning device 300 includes a learning voice database 310a, a generation unit 320, an extraction unit 325, a first calculation unit 330, a third calculation unit 340, a connection unit 345, a second calculation unit 350, and a learning unit 360.

The learning voice database 310a stores a plurality of learning voice data, each of which is associated with correct answer information 310b. The correct answer information 310b is information indicating whether or not a specific conversation situation is included in voice data. In the second embodiment, as an example, the specific conversation situation is referred to as an "abnormal conversation situation."

The generation unit 320 acquires the learning voice data from the learning voice database 310a. In the following description of the learning device 300, the learning voice data acquired from the learning voice database is simply referred to as "voice data." The generation unit 320 performs phoneme recognition on the voice data to generate information of a maximum likelihood phoneme sequence. For example, the maximum likelihood phoneme sequence is a sequential arrangement of probabilistically plausible phonemes. The generation unit 320 converts each phoneme into a One Hot vector, and outputs the One Hot vector of each phoneme to the first calculation unit 330.

The extraction unit 325 is a processing unit that extracts non-linguistic information from the voice data and generates a vector of the non-linguistic information. For example, the non-linguistic information is information such as a stress evaluation value, a conversation time and the like. The stress evaluation value, the conversation time and the like are set in each dimension of the vector of the non-linguistic information. The extraction unit 325 outputs the vector of the non-linguistic information to the connection unit 345.

The first calculation unit 330 is a processing unit that calculates internal vectors by sequentially inputting One Hot vectors of phonemes to a first network having a recursive path and performing a calculation based on a set of parameters of the first network. For example, the first network corresponds to an LSTM. The first calculation unit 330 outputs the internal vectors that are obtained by inputting One Hot vectors of all phonemes included in the voice data to the first network, to the third calculation unit 340. In addition, it is assumed that the LSTM model 110c (set of parameters) learned by the learning device 100 according to the first embodiment is set in the LSTM used by the first calculation unit 330.

The third calculation unit 340 is a processing unit that averages a plurality of internal vectors output from the first calculation unit 330. The third calculation unit 340 outputs the obtained average internal vector to the connection unit 345. In the following description, the obtained average internal vector is referred to as an "average vector."

The connection unit 345 is a processing unit that generates a connected vector by connecting the average vector output from the third calculation unit 340 and the vector of the non-linguistic information output from the extraction unit 325. The connection unit 345 outputs the connected vector to the second calculation unit 350.

The second calculation unit 350 is a processing unit that calculates an output value (neuron value) by inputting the connected vector to a third network having no recursive path and performing a calculation based on a set of parameters of the third network. The second calculation unit 350 outputs the output value to the learning unit 360.

When the connected vector for the voice data is input, the learning unit 360 learns (error back-propagation learning) the parameters of the second calculation unit 350 such that the output value output from the second calculation unit 350 approaches the correct answer information 310b corresponding to the voice data. The learning unit 360 repeatedly performs the error back-propagation learning until the learning stop condition is satisfied and generates a DNN model 310d. The DNN model 310d is information corresponding to the learned set of parameters of the third network. The learning device 300 notifies the determination device 400 of information of the DNN model 310d.

The determination device 400 includes a generation unit 420, an extraction unit 425, a first calculation unit 430, a third calculation unit 440, a connection unit 445, a second calculation unit 450, and a determination unit 460.

The generation unit 420 receives voice data which is a target of detection as to whether or not an abnormal conversation situation is included in the voice data. In the following description of the determination device 400, the voice data which is a target of detection as to whether or not an abnormal conversation situation is included in the voice data is simply referred to as "voice data." The generation unit 420 performs phoneme recognition on the voice data to generate information of the maximum likelihood phoneme sequence. The generation unit 420 converts each phoneme into a One Hot vector and outputs the One Hot vector of each phoneme to the first calculation unit 430.

The extraction unit 425 is a processing unit that extracts non-linguistic information from the voice data and generates a vector of the non-linguistic information. For example, the non-linguistic information is information such as a stress evaluation value, a conversation time and the like. The stress evaluation value, the conversation time and the like are set in each dimension of the vector of the non-linguistic information. The extraction unit 425 outputs the vector of the non-linguistic information to the connection unit 445.

The first calculation unit 430 is a processing unit that calculates internal vectors by sequentially inputting One Hot vectors of phonemes to a first network having a recursive path and performing a calculation based on a set of parameters of the first network. The first calculation unit 430 uses the set of parameters of the LSTM model 110c learned by the learning device 100 of the first embodiment as the parameter to be set in the first network. The first calculation unit 430 outputs the internal vectors that are obtained by inputting One Hot vectors of all phonemes included in the voice data to the first network, to the third calculation unit 440.

The third calculation unit 440 is a processing unit that averages the plurality of internal vectors output from the first calculation unit 430. The third calculation unit 440 outputs the obtained average internal vector to the connection unit 445. In the following description, the obtained average internal vector is referred to as an "average vector."

The connection unit 445 is a processing unit that generates a connected vector by connecting the average vector output from the third calculation unit 440 and the vector of the non-linguistic information output from the extraction unit 425. The connection unit 445 outputs the connected vector to the second calculation unit 450.

The second calculation unit 450 is a processing unit that calculates an output value (neuron value) by inputting the connected vector to a third network having no recursive path and performing a calculation based on a set of parameters of the third network. The second calculation unit 450 uses the set of parameters of the DNN model 310d as the parameter to be set in the third network. The second calculation unit 450 outputs the output value to the determination unit 460.

The determination unit 460 is a processing unit that compares the output value output from the second calculation unit 450 with a threshold value to determine whether or not an abnormal conversation situation is included in the voice data. For example, when the output value is equal to or larger than the threshold value, the determination unit 460 determines that an abnormal conversation situation is included in the voice data.

As described above, the learning device 300 according to the second embodiment extracts the non-linguistic information from the voice data, and performs machine learning on the DNN model 310d using the connected vector that has been obtained by connecting the vector of the non-linguistic information and the internal vector. In this manner, learning is performed by using the vector of the non-linguistic information vector as well, so that the accuracy of detection of an abnormal conversation situation may be improved. For example, it has been experimentally confirmed that the use of the vector of the non-linguistic information halves detection omissions without increasing the false detection rate, as compared to a case where the vector of the non-linguistic information is not used.

Figure 15:
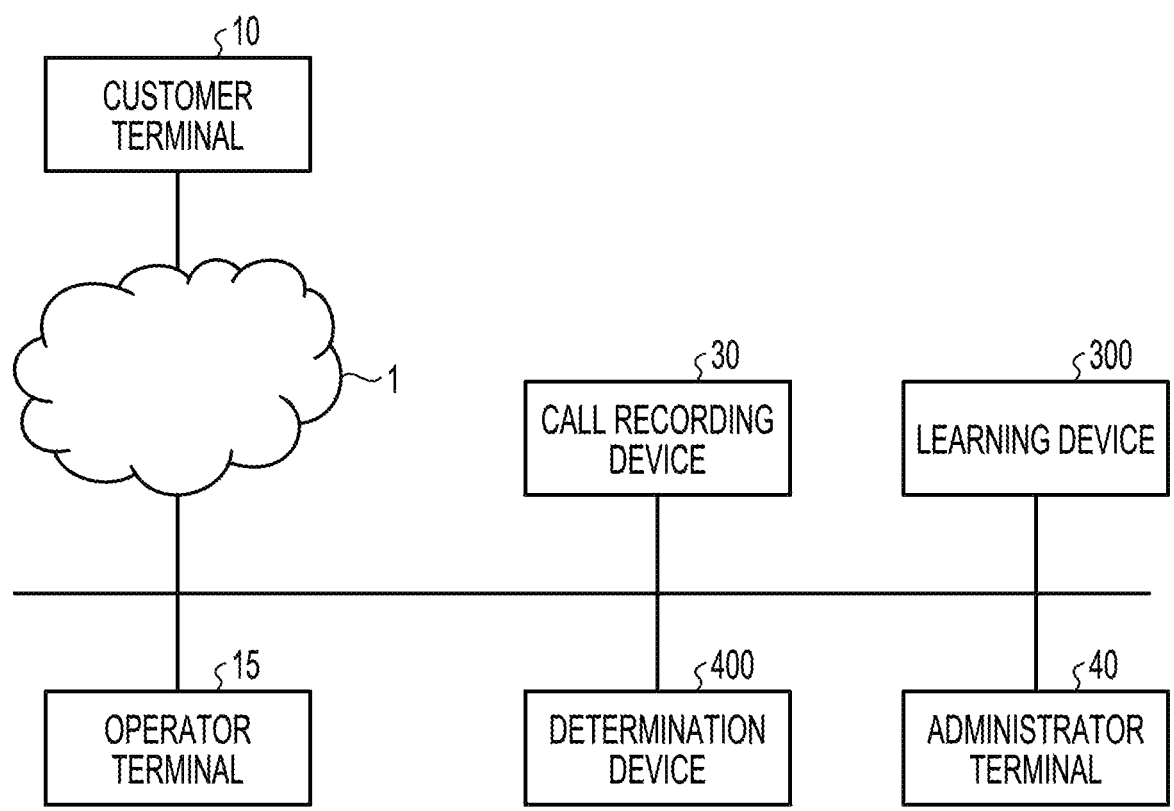
FIG. 15 is a view illustrating an example of a system according to the second embodiment.

Next, an example of a system according to the second embodiment will be described. FIG. 15 is a view illustrating an example of a system according to the second embodiment. This system includes a customer terminal 10, an operator terminal 15, a call recording device 30, an administrator terminal 40, a learning device 300, and a determination device 400. The description of the customer terminal 10, the operator terminal 15, the call recording device 30, and the administrator terminal 40 is the same as that of the customer terminal 10, the operator terminal 15, the call recording device 30, and the administrator terminal 40 illustrated in FIG. 3.

Figure 16:
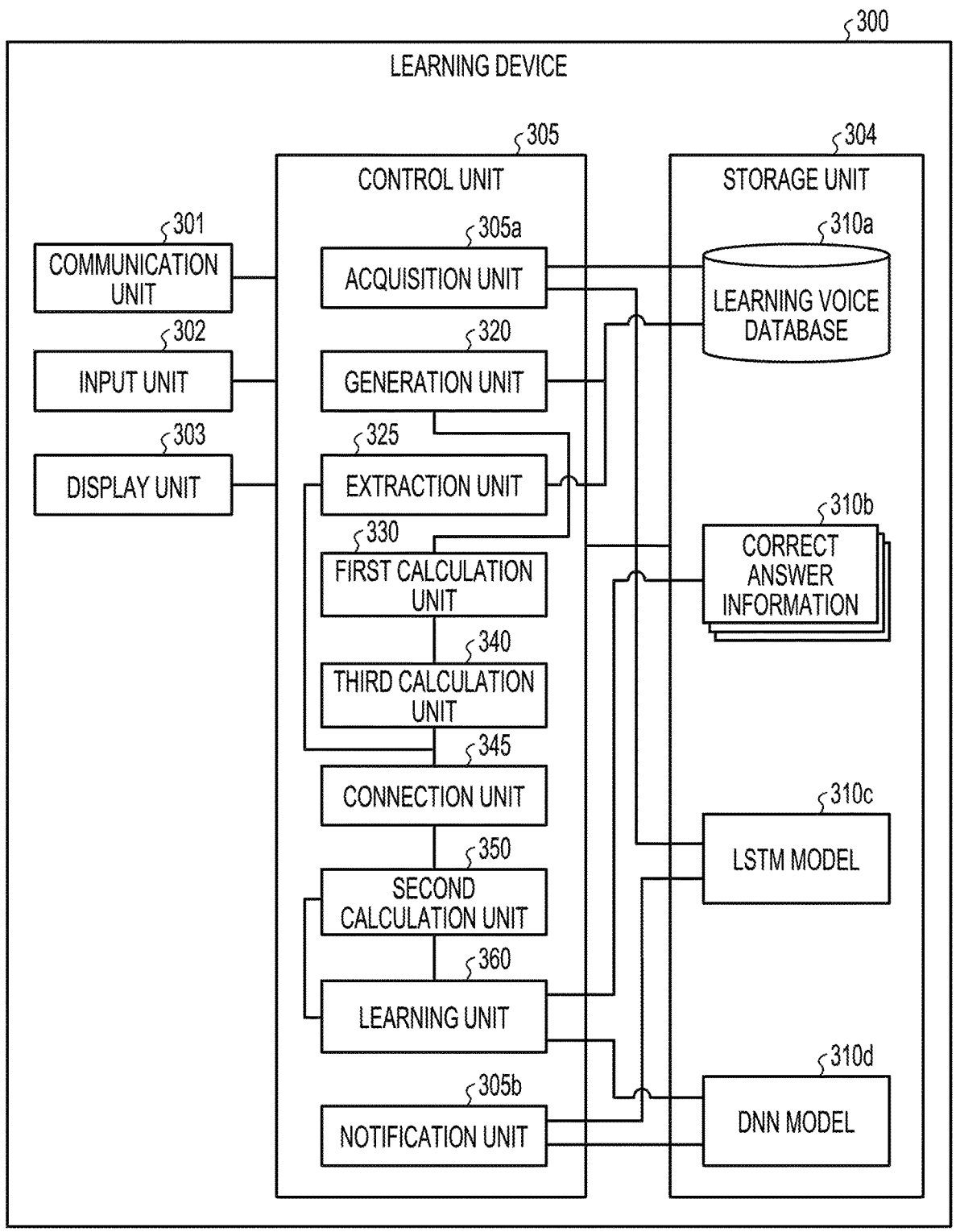
FIG. 16 is a functional block diagram illustrating the configuration of the learning device according to the second embodiment.

An example of the configuration of the learning device 300 illustrated in FIG. 15 will be described. FIG. 16 is a functional block diagram illustrating the configuration of the learning device according to the second embodiment. As illustrated in FIG. 16, the learning device 300 includes a communication unit 301, an input unit 302, a display unit 303, a storage unit 304, and a control unit 305.

The description of the communication unit 301, the input unit 302, and the display unit 303 is the same as that of the communication unit 101, the input unit 102, and the display unit 103 illustrated in FIG. 4.

The storage unit 304 includes a learning voice database 310a, correct answer information 310b, an LSTM model 310c, and a DNN model 310d. The storage unit 304 corresponds to a semiconductor memory device such as a RAM or a flash memory, or a storage device such as an HDD.

The learning voice database 310a is a database that stores a plurality of learning voice data. Each voice data stored in the learning voice database 310a is voice data of a conversation between a customer and an operator.

The correct answer information 310b is information indicating whether or not an abnormal conversation situation is included in each voice data stored in the learning voice database 310a.

The LSTM model 310c is information corresponding to the set of parameters of the first network (LSTM), and is learned in advance using the learning device 100 illustrated in the first embodiment. The DNN model 310d is information corresponding to the set of parameters of the third network (DNN). Only the DNN model 310d is machine-learned by the learning unit 360.

The control unit 305 includes an acquisition unit 305a, a notification unit 305b, a generation unit 320, an extraction unit 325, a first calculation unit 330, a third calculation unit 340, a connection unit 345, a second calculation unit 350, and a learning unit 360. The control unit 305 may be implemented by a CPU, an MPU or the like. The control unit 305 may also be implemented by a hard-wired logic such as an ASI, an FPGA or the like.

The acquisition unit 305a is a processing unit that acquires information of the learning voice database 310a from the call recording device 30. The acquisition unit 305a stores the information of the learning voice database 310a in the storage unit 304. Further, when the correct answer information 310b is acquired, the acquisition unit 305a stores the acquired correct answer information 310b in the storage unit 304. The correct answer information 310b may be associated in advance with each voice data in the learning voice database 310a.

The notification unit 305b is a processing unit that notifies the determination device 400 of the LSTM model 310c learned in advance and the DNN model 310d learned by the learning unit 360.

The generation unit 320 is a processing unit that acquires learning voice data from the learning voice database 310a and generates information of a maximum likelihood phoneme sequence based on the voice data. The other description of the generation unit 320 is the same as that of the generation unit 120. The generation unit 320 outputs a One Hot vector corresponding to each phoneme to the first calculation unit 330.

The extraction unit 325 is a processing unit that extracts non-linguistic information from the voice data and generates a vector of the non-linguistic information. For example, the non-linguistic information is information such as a stress evaluation value, a conversation time and the like. The extraction unit 325 outputs the non-linguistic information vector to the connection unit 345.

Figure 17:
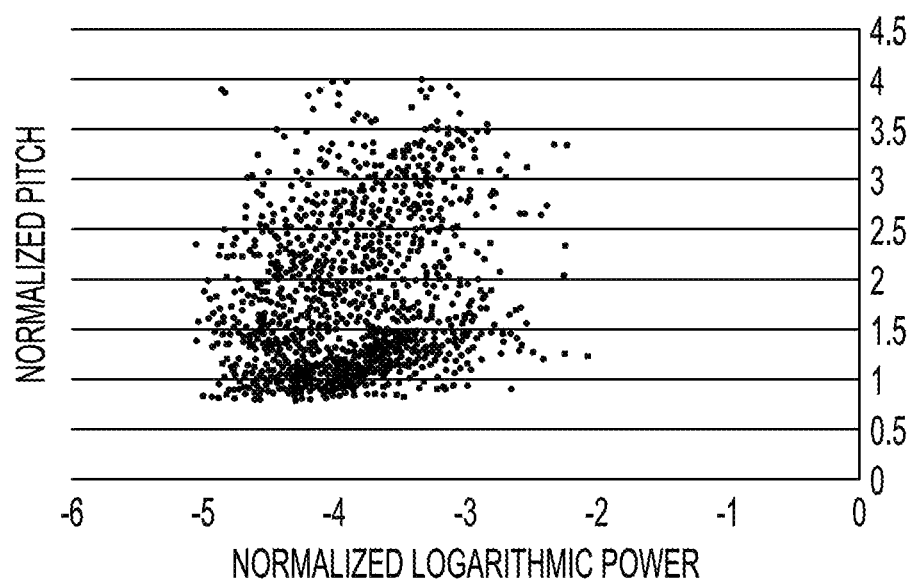
FIG. 17 is a view illustrating a relationship between pitch and power, which can be obtained from voice data of a normal conversation.
Figure 18:
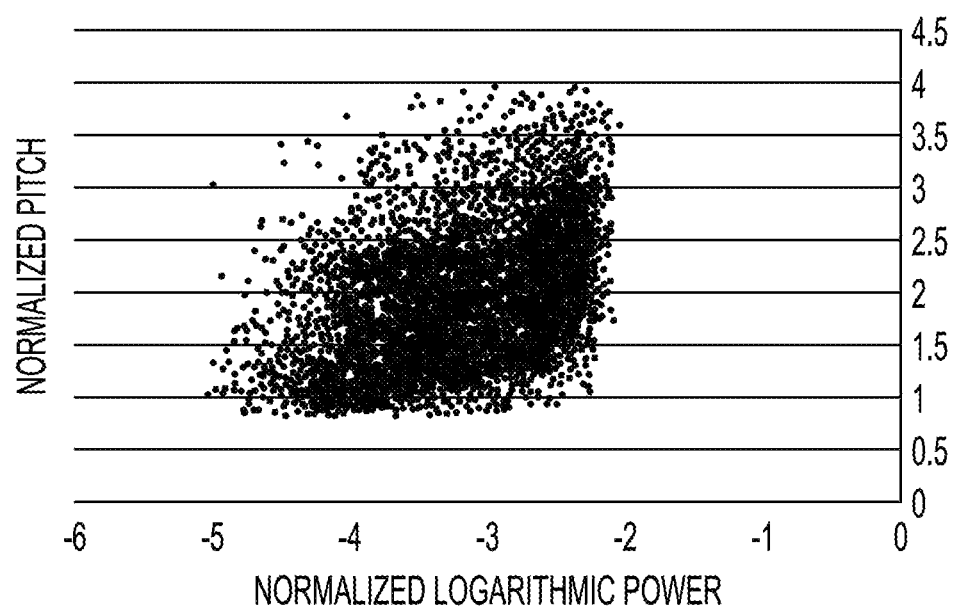
FIG. 18 is a view illustrating a relationship between pitch and power, which can be obtained from voice data of an abnormal conversation.

An example of a process of calculating a stress evaluation value by the extraction unit 325 will be described. The extraction unit 325 uses the technique described in, for example, Japanese Laid-open Patent Publication No. 2015-82093, to calculate a stress evaluation value from the voice data. FIG. 17 is a view illustrating a relationship between pitch and power, which may be obtained from voice data of a normal conversation. In a graph of FIG. 17, the vertical axis represents a normalized pitch, and the horizontal axis represents normalized logarithmic power. FIG. 18 is a diagram illustrating a relationship between pitch and power, which may be obtained from voice data of an abnormal conversation. In a graph of FIG. 18, the vertical axis represents a normalized pitch, and the horizontal axis represents normalized logarithmic power.

As illustrated in FIG. 17, in the voice data of the normal conversation, values of pitch (normalized pitch) and power (normalized logarithmic power) are distributed around the average loudness and pitch of voice of a speaker. Meanwhile, as illustrated in FIG. 18, in the voice data of the abnormal conversation, values of pitch (normalized pitch) and power (normalized logarithmic power) are greatly spread. By using the characteristic, the extraction unit 325 quantifies the spread state of the pitch and power values and calculates a stress evaluation value. The extraction unit 325 uses statistics (mean and variance) of voice pitch and loudness to calculate the stress evaluation value. The stress evaluation value is used as a numerical value indicating the degree of abnormality (a state different from normality) of the entire conversation, rather than indicating the stress of each speaker.

An example of a process of calculating a conversation time by the extraction unit 325 will be described. The extraction unit 325 analyzes the voice data and calculates a difference between the start time of the first voice section and the end time of the last voice section as a conversation time.

The first calculation unit 330 is a processing unit that calculates an internal vector by sequentially inputting a One Hot vector of each phoneme to a first network having a recursive path and performing a calculation based on a set of parameters of the first network. The first calculation unit 330 outputs the internal vector to the third calculation unit 340. The other description of the first calculation unit 330 is the same as that of the first calculation unit 130.

The third calculation unit 340 is a processing unit that averages a plurality of internal vectors "h" output from the first calculation unit 330. The third calculation unit 340 outputs the obtained average internal vector (average vector) to the connection unit 345.

The connection unit 345 is a processing unit that generates a connected vector by connecting the average vector output from the third calculation unit 340 and the vector of the non-linguistic information output from the extraction unit 325. The connection unit 345 outputs the connected vector to the second calculation unit 350.

The second calculation unit 350 is a processing unit that calculates an output value (neuron value) by inputting the connected vector to a third network having no recursive path and performing a calculation based on a set of parameters of the third network. The other description of the second calculation unit 350 is the same as the description of the second calculation unit 150.

The learning unit 360 is a processing unit that executes a learning process on the DNN model 310d. The learning unit 360 sets parameters included in the LSTM model 310c as the parameter of the LSTM 135 used by the first calculation unit 330.

The learning unit 360 learns the parameters of the second calculation unit 350 such that when the One Hot vector of each phoneme generated from the voice data is input to the first calculation unit 330 and the voice data is input the extraction unit 325 respectively, the output value output from the second calculation unit 350 through the third calculation unit 340 and the connection unit 345 approaches the correct answer information 310b corresponding to the voice data. The learning unit 360 repeatedly performs the parameter learning such that the value of a loss function becomes the minimum value by back-propagating an error of the loss function. The learning unit 360 sets a learning stop condition and ends the learning when the learning stop condition is satisfied. The learning unit 360 stores the set of parameters of the neural network 155 at the end time of the learning in the storage unit 304 as the DNN model 310d.

Figure 19:
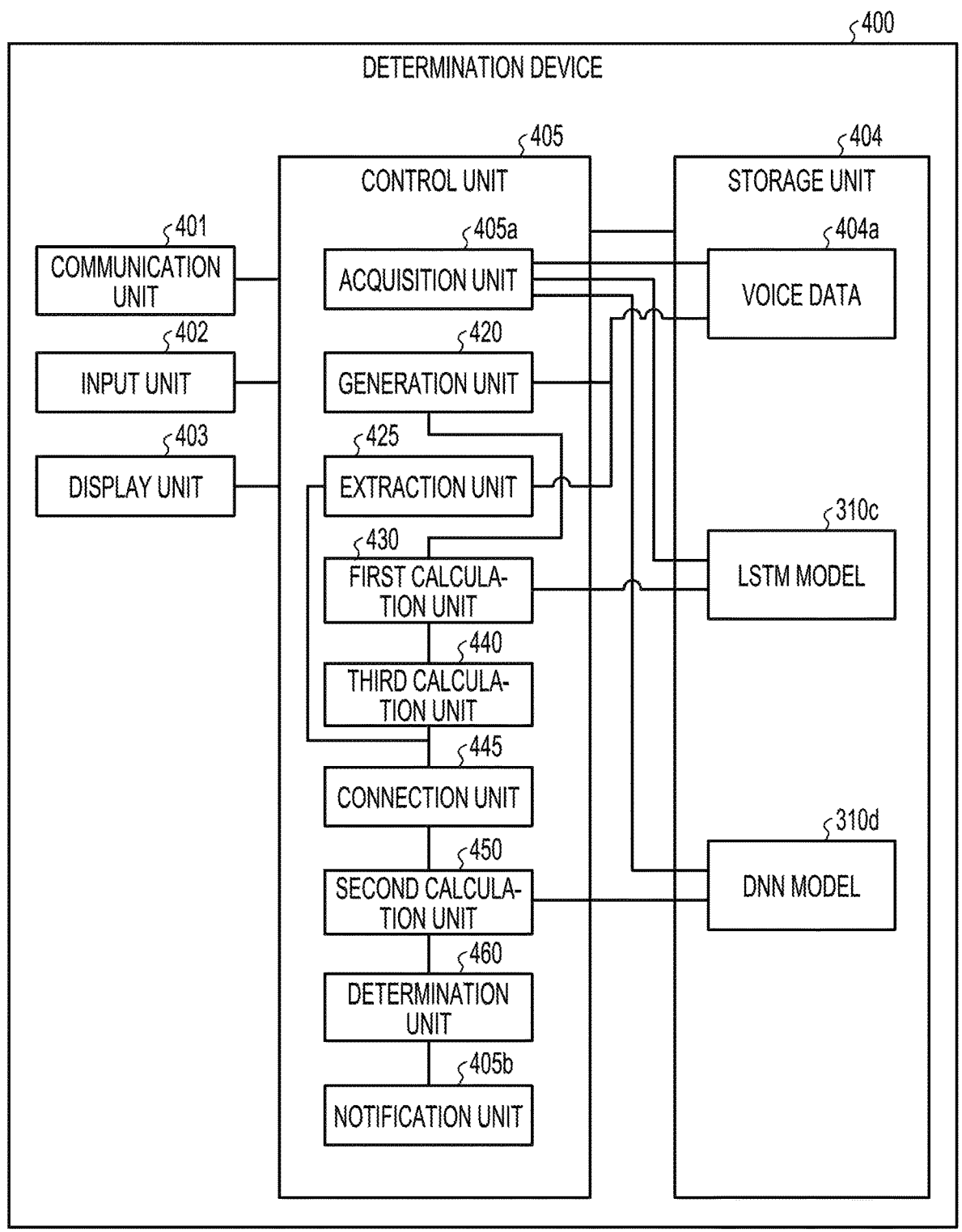
FIG. 19 is a functional block diagram illustrating the configuration of the determination device according to the second embodiment.

Next, an example of the configuration of the determination device 400 illustrated in FIG. 15 will be described. FIG. 19 is a functional block diagram illustrating the configuration of the determination device according to the second embodiment. As illustrated in FIG. 19, the determination device 400 includes a communication unit 401, an input unit 402, a display unit 403, a storage unit 404, and a control unit 405.

The description of the communication unit 401, the input unit 402, and the display unit 403 is the same as that of the communication unit 201, the input unit 202, and the display unit 203 illustrated in FIG. 9.

The storage unit 404 stores voice data 404a, an LSTM model 310c, and a DNN model 310d. The storage unit 404 corresponds to a semiconductor memory device such as a RAM, a flash memory or the like, or a storage device such as an HDD or the like.

The voice data 404a is voice data of a conversation between a customer and an operator, which is recorded by the call recording device 30, and is voice data which is a target of detection of an abnormal conversation situation.

The LSTM model 310c is information corresponding to the set of parameters of the first network (LSTM 135) learned in advance by the learning device 100.

The DNN model 310d is information corresponding to the set of parameters of the third network (neural network 155) learned by the learning device 300.

The control unit 405 includes an acquisition unit 405a, a notification unit 405b, a generation unit 420, a first calculation unit 430, an extraction unit 425, a third calculation unit 440, a connection unit 445, a second calculation unit 450, and a determination unit 460. The control unit 405 may be implemented by a CPU, an MPU or the like. The control unit 405 may also be implemented by a hard-wired logic such as an ASIC, an FPGA or the like.

The acquisition unit 405a is a processing unit that acquires the voice data 404a from the call recording device 30. The acquisition unit 405a stores the voice data 404a in the storage unit 404. In addition, the acquisition unit 405a acquires information of the LSTM model 310c learned in advance by the learning device 100 and acquired and stored for the internal vector calculation, and information of the DNN model 310d learned by the learning unit 360, from the learning device 300. The acquisition unit 405a stores the information of the LSTM model 310c and the information of the DNN model 310d in the storage unit 404.

The notification unit 405b acquires a determination result from the determination unit 460 to be described later. When the determination unit 460 determines that an abnormal conversation situation is included in the voice data 404a, the notification unit 405b notifies the administrator terminal 40 of information indicating that an abnormal conversation situation is included in the voice data 404a.

The generation unit 420 is a processing unit that acquires the voice data 404a and generates information of a maximum likelihood phoneme sequence based on the voice data 404a. Similarly to the generation unit 320 of the learning device 300, the generation unit 420 generates a maximum likelihood phoneme sequence from the voice data 404a and generates a One Hot vector of each phoneme. The generation unit 420 outputs the One Hot vector of each phoneme to the first calculation unit 430.

The extraction unit 425 is a processing unit that extracts non-linguistic information from the voice data 404a and generates a vector of the non-linguistic information. For example, the non-linguistic information is information such as a stress evaluation value, a conversation time and the like. The stress evaluation value, the conversation time and the like are set in each dimension of the non-linguistic information vector. The extraction unit 425 outputs the non-linguistic information vector to the connection unit 445. The other processing of the extraction unit 425 is the same as that of the extraction unit 325.

The first calculation unit 430 is a processing unit that calculates an internal vector by sequentially inputting the One Hot vector of each phoneme to a first network having a recursive path and performing a calculation based on a set of parameters of the first network. The first calculation unit 430 uses the set of parameters of the LSTM model 310c as the parameter to be set in the first network. The first calculation unit 430 outputs each of the internal vectors that are obtained by inputting the One Hot vectors of all phonemes included in the voice data to the first network, to the third calculation unit 440.

The third calculation unit 440 is a processing unit that averages a plurality of internal vectors output from the first calculation unit 430. The third calculation unit 440 outputs the obtained average internal vector (average vector) to the connection unit 445.

The connection unit 445 is a processing unit that generates a connected vector by connecting the average vector output from the third calculation unit 440 and the vector of the non-linguistic information output from the extraction unit 425. The connection unit 445 outputs the connected vector to the second calculation unit 450.

The second calculation unit 450 is a processing unit that calculates output values (neuron values) by inputting the connected vector to a third network having no recursive path and performing a calculation based on a set of parameters of the third network. The third network used by the second calculation unit 450 corresponds to the neural network 155 described with reference to FIG. 8 similar to the network described in the first embodiment. The second calculation unit 450 sets the parameters of the DNN model 310d as the parameter of the neural network 155, and calculates a probability "Ot" that a conversation is in an abnormal conversation situation and a probability "On" that the conversation is in a normal conversation situation. The second calculation unit 450 outputs information of the probability "Ot" to the determination unit 460.

The determination unit 460 is a processing unit that determines whether or not an abnormal conversation situation is included in the voice data 404a, based on the probability "Ot" that the conversation is in the abnormal conversation situation. For example, when the probability Ot is equal to or larger than a preset threshold value, the determination unit 460 determines that an abnormal conversation situation is included in the voice data 404a. The determination unit 460 outputs the determination result to the notification unit 405b. In this example, the determination is performed based on the probability "Ot" that the conversation is in the abnormal conversation situation. However, the determination may be performed based on a difference or ratio between the probability "Ot" and the probability "On" that the conversation is in the normal conversation situation.

Figure 20:
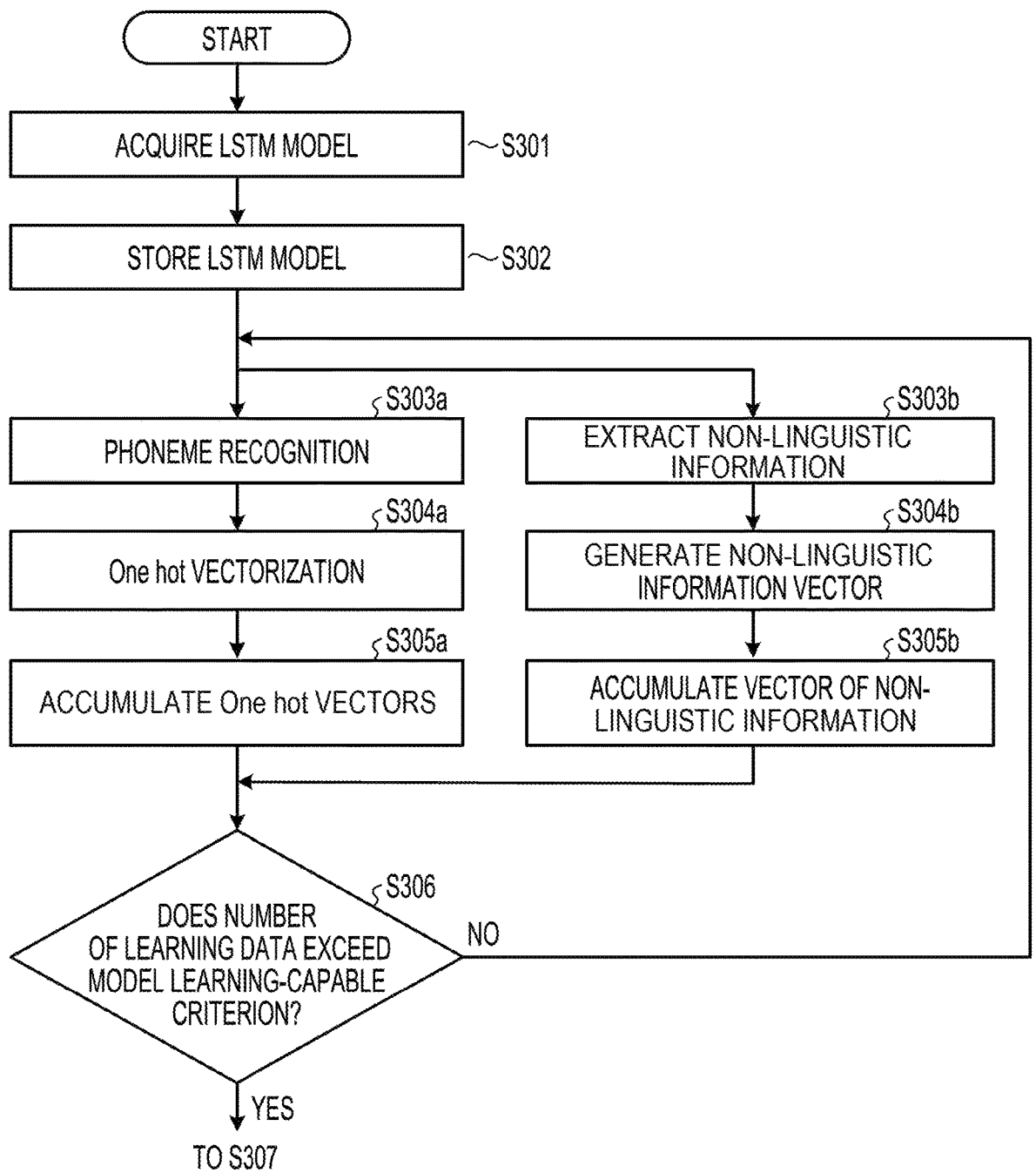
FIG. 20 is a flowchart (1) illustrating a processing procedure of the learning device according to the second embodiment.
Figure 21:
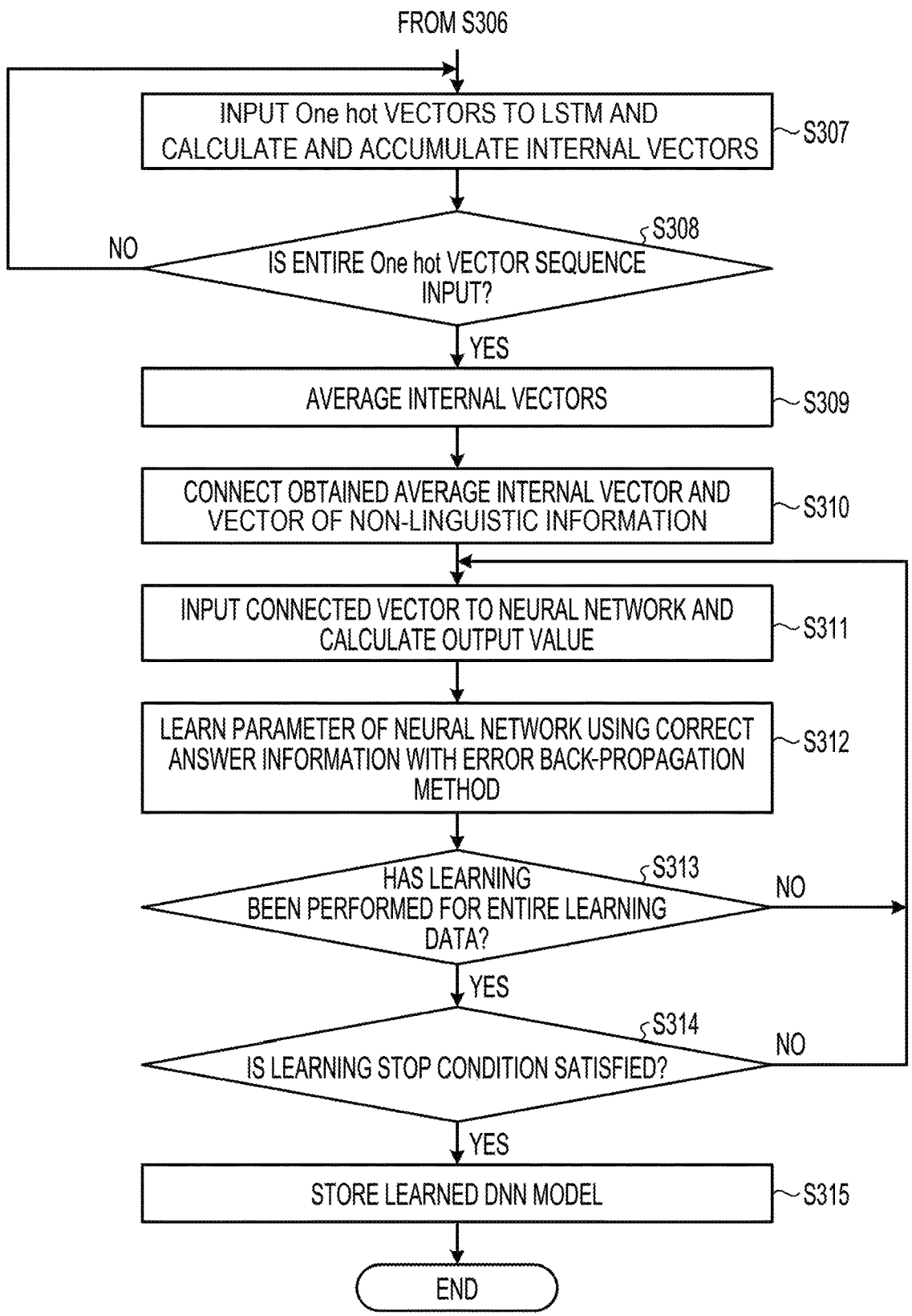
FIG. 21 is a flowchart (2) illustrating a processing procedure of the learning device according to the second embodiment.

Next, an example of a processing procedure of the learning device 300 according to the second embodiment will be described. FIGS. 20 and 21 are flowcharts illustrating a processing procedure of the learning device according to the second embodiment. As illustrated in FIG. 20, the acquisition unit 305a of the learning device 300 acquires an LSTM model 310c (step S301). The LSTM model 310c corresponds to the model that is executed by the learning device 100 according to the first embodiment as described with reference to FIG. 10. The learning unit 360 of the learning device 300 stores the LSTM model 310c learned in a first learning process in the storage unit 304 (step S302).

The generation unit 320 of the learning device 300 acquires learning voice data and performs phoneme recognition (step S303a). The generation unit 320 converts phonemes into One Hot vectors (step S304a). The generation unit 320 accumulates the One Hot vectors (step S305a).

The extraction unit 325 of the learning device 300 extracts non-linguistic information from the learning voice data (step S303b). The extraction unit 325 generates a vector of the non-linguistic information (step S304b) and accumulates the vector of the non-linguistic information (step S305b).

When the number of learning data does not exceed a model learning-capable criterion (No in step S306), the learning device 300 proceeds to steps S303a and 303b. Meanwhile, when the number of learning data exceeds the model learning-capable criterion (Yes in step S306), the learning device 300 proceeds to step S307 in FIG. 21.

Referring to FIG. 21, the first calculation unit 330 of the learning device 300 inputs the One Hot vectors to the LSTM 135 and calculates and accumulates internal vectors (step S307). When the entire One Hot vector sequence is not input (No in step S308), the first calculation unit 330 proceeds to step S307. Meanwhile, when the entire One Hot vector sequence is input (Yes in step S308), the first calculation unit 330 proceeds to step S309. The third calculation unit 340 of the learning device 300 averages the internal vectors (step S309).

The connection unit 345 of the learning device 300 connects the obtained average internal vector and the vector of the non-linguistic information vector (step S310). The second calculation unit 350 of the learning device 300 inputs the connected vector to the neural network 155 and calculates an output value (step S311). The learning unit 360 of the learning device 300 uses the correct answer information 310b to learn the parameters of the neural network 155 by the error back-propagation method (step S312).

When learning is not performed on the entire learning data (No in step S313), the learning unit 360 proceeds to step S311. Meanwhile, when learning is performed on the entire learning data (Yes in step S313), the learning unit 360 proceeds to step S314.

When the learning stop condition is not satisfied (No in step S314), the learning unit 360 changes the order of the learning data at random and then proceeds to step S311. Meanwhile, when the learning stop condition is satisfied (Yes in step S314), the learning unit 360 proceeds to step S315. The learning unit 360 stores the learned DNN model 310d in the storage unit 304 (step S315).

Figure 22:
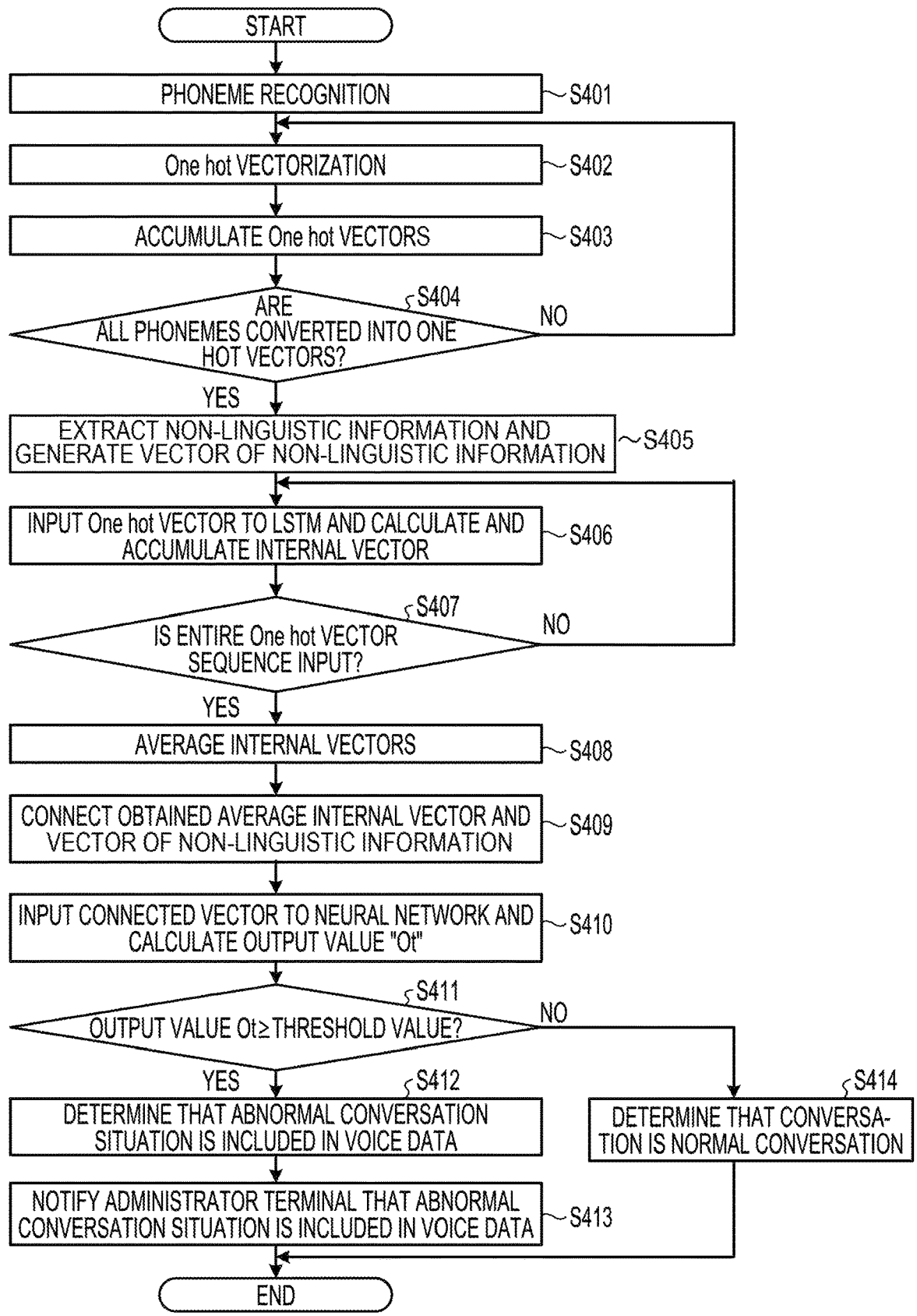
FIG. 22 is a flowchart illustrating a processing procedure of the determination device according to the second embodiment.

Next, an example of a processing procedure of the determination device 400 according to the second embodiment will be described. FIG. 22 is a flowchart illustrating a processing procedure of the determination device according to the second embodiment. As illustrated in FIG. 22, the generation unit 420 of the determination device 400 performs phoneme recognition (step S401) and converts phonemes into One Hot vectors (step S402). The generation unit 420 accumulates the One Hot vectors (step S403). When all phonemes are not converted into One Hot vectors (No in step S404), the generation unit 420 proceeds to step S402. Meanwhile, when all phonemes are converted into One Hot vectors (Yes in step S404), the generation unit 420 proceeds to step S405.

The extraction unit 425 of the determination device 400 extracts non-linguistic information from the voice data and generates a vector of the non-linguistic information (step S405). The first calculation unit 430 of the determination device 400 inputs the One Hot vectors to the LSTM 135 and calculates and accumulates internal vectors (step S406). In addition, the first calculation unit 430 uses the LSTM 135 based on the learned LSTM model 310c to calculate the internal vectors. When the entire One Hot vector sequence is not input (No in step S407), the first calculation unit 430 proceeds to step S406. When the entire One Hot vector sequence is input (Yes in step S407), the first calculation unit 430 proceeds to step S408.

The third calculation unit 440 of the determination device 400 averages the internal vectors (step S408). The connection unit 445 of the determination device 400 connects the obtained average internal vector and the vector of the non-linguistic information (step S409). The second calculation unit 450 of the determination device 400 inputs the connected vector to the neural network 155 and calculates an output value "Ot" (step S410). The second calculation unit 450 uses the neural network 155 based on the learned DNN model 310d to calculate the output value. The output value "Ot" represents a probability that a conversation is in an abnormal conversation situation.

The determination unit 460 of the determination device 400 determines whether or not the output value Ot is equal to or larger than a threshold value (step S411). When the output value Ot is equal to or larger than the threshold value (Yes in step S411), the determining unit 460 determines that an abnormal conversation situation is included in the voice data 404a (step S412). The notification unit 405b of the determination device 400 notifies the administrator terminal 40 that an abnormal conversation situation is included in the voice data 404a (step S413).

Meanwhile, when the output value Ot is smaller than the threshold value (No in step S411), the determination unit 460 determines that the conversation is a normal conversation (step S414).

Next, the effects of the learning device 300 according to the second embodiment will be described. The learning device 300 extracts the non-linguistic information from the voice data and performs machine learning on the DNN model 310d using the connected vector that has been obtained by connecting the vector of the non-linguistic information and the internal vector. In this manner, learning is performed by using the vector of the non-linguistic information as well, so that the accuracy of detection of an abnormal conversation situation may be improved. In addition, when the determination device 400 detects an abnormal conversation situation using the DNN model 310d, it is possible to reduce detection omissions without increasing the false detection rate, as compared with a case where the vector of the non-linguistic information is not used.

Third Embodiment

The processing of the learning devices 100 and 300 and the determination devices 200 and 400 described above in the first and second embodiments is an example. According to a third embodiment, descriptions will be made on other processing of the learning devices 100 and 300 and the determination devices 200 and 400.

Figure 23:
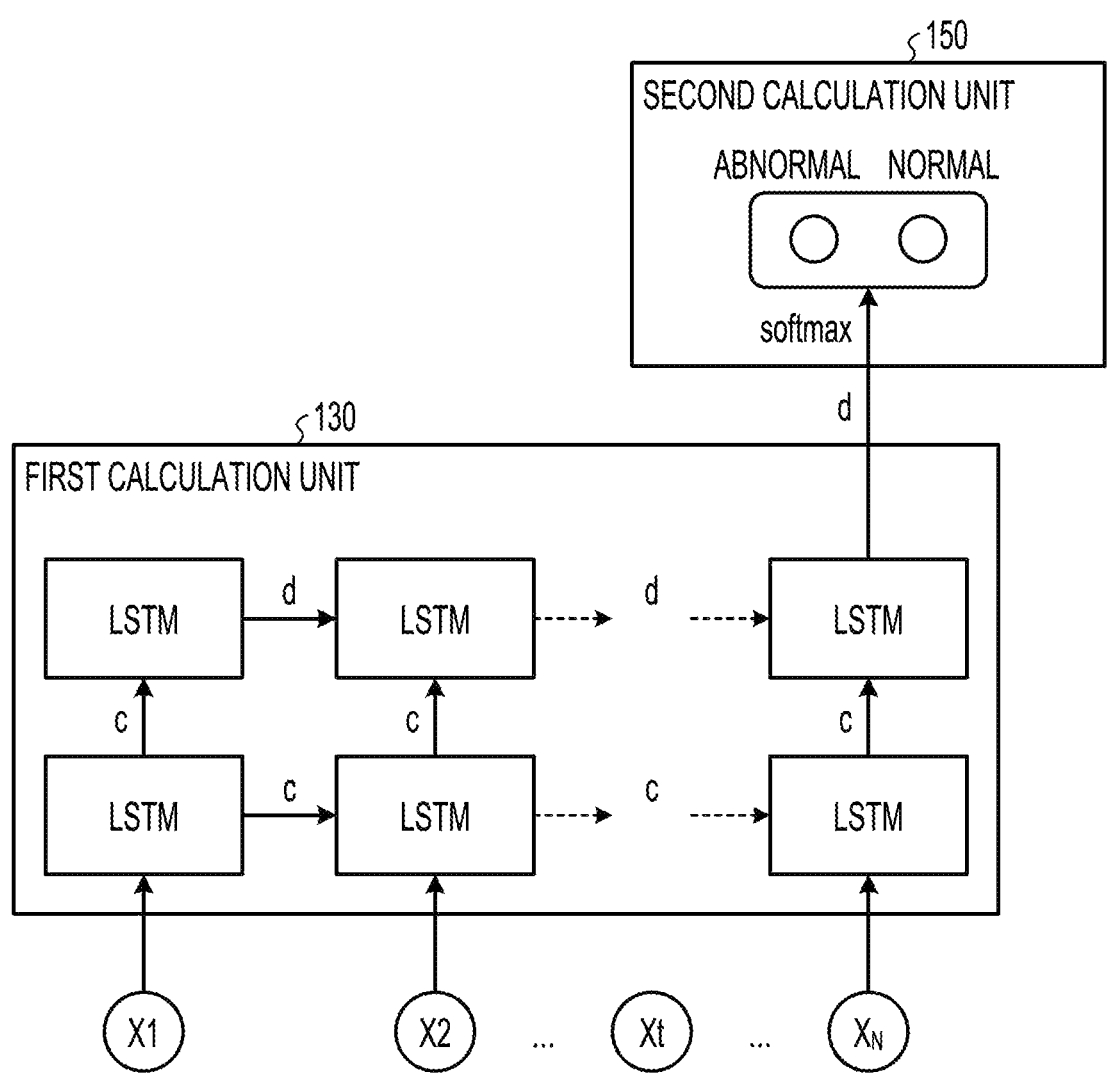
FIG. 23 is a view for explaining an example of extension of a first calculation unit and a second calculation unit.

An example of extension of the first calculation unit and the second calculation unit will be described. FIG. 23 is a view for explaining an example of extension of the first calculation unit and the second calculation unit. Here, as an example, description will be made using the first calculation unit 130 and the second calculation unit 150.

The first calculation unit 130 makes the LSTM which is the first network multistage, and sets an internal vector "d" of an LSTM of the upper stage as an abnormal/normal two-dimensional vector. In addition, an internal vector "c" corresponds to the internal vector "h" described with reference to FIG. 7. For example, the internal vector "c" is a 128-dimensional vector. The internal vector "d" is input to the second calculation unit 150 through the third calculation unit 140 (not illustrated).

The second calculation unit 150 executes only the Softmax calculation for the internal vector "d" without executing the second network, and calculates a probability of abnormal conversation situation and a probability of normal conversation. The essential component of the second calculation unit 150 is a processing unit that performs the Softmax calculation, and is to obtain probabilities of abnormality/normality from the internal vector "d". Therefore, the first calculation unit 130 and the second calculation unit 150 may be extended as illustrated in FIG. 23.

Figure 24:
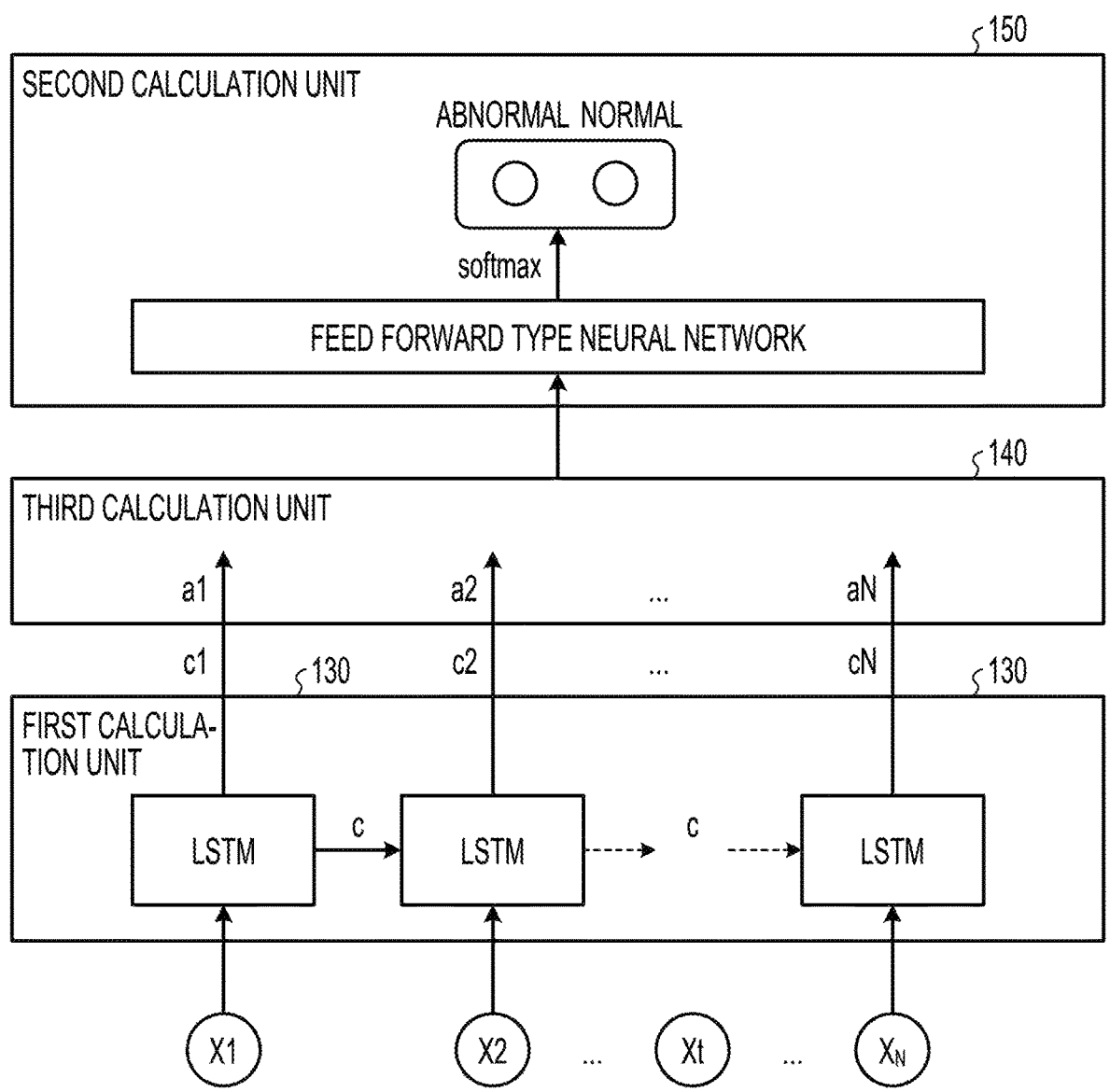
FIG. 24 is a view for explaining other processing of a third calculation unit.

The other processing of the third calculation unit will be described. FIG. 24 is a view for explaining other processing of the third calculation unit. Here, as an example, description will be made using the first calculation unit 130, the second calculation unit 150, and the third calculation unit 140.

The third calculation unit 140 sets weight parameters "a1, a2, . . . , aN" for internal vectors c1 to cN output for respective input phonemes from the first calculation unit 130, in an order from the head of the internal vectors c1 to cN. Such weights are a set of parameters in the time direction. For example, a vector output from the third calculation unit 140 to the second calculation unit 150 is "a1·c1+a2·c2+ . . . +aN·cN". When learning the LSTM model 110c and the DNN model 110d, the learning unit 160 also learns the weight parameters of the third calculation unit 140. By performing such processing, it is possible to optimize the weight in the time direction when an average vector is generated.

Figure 25:
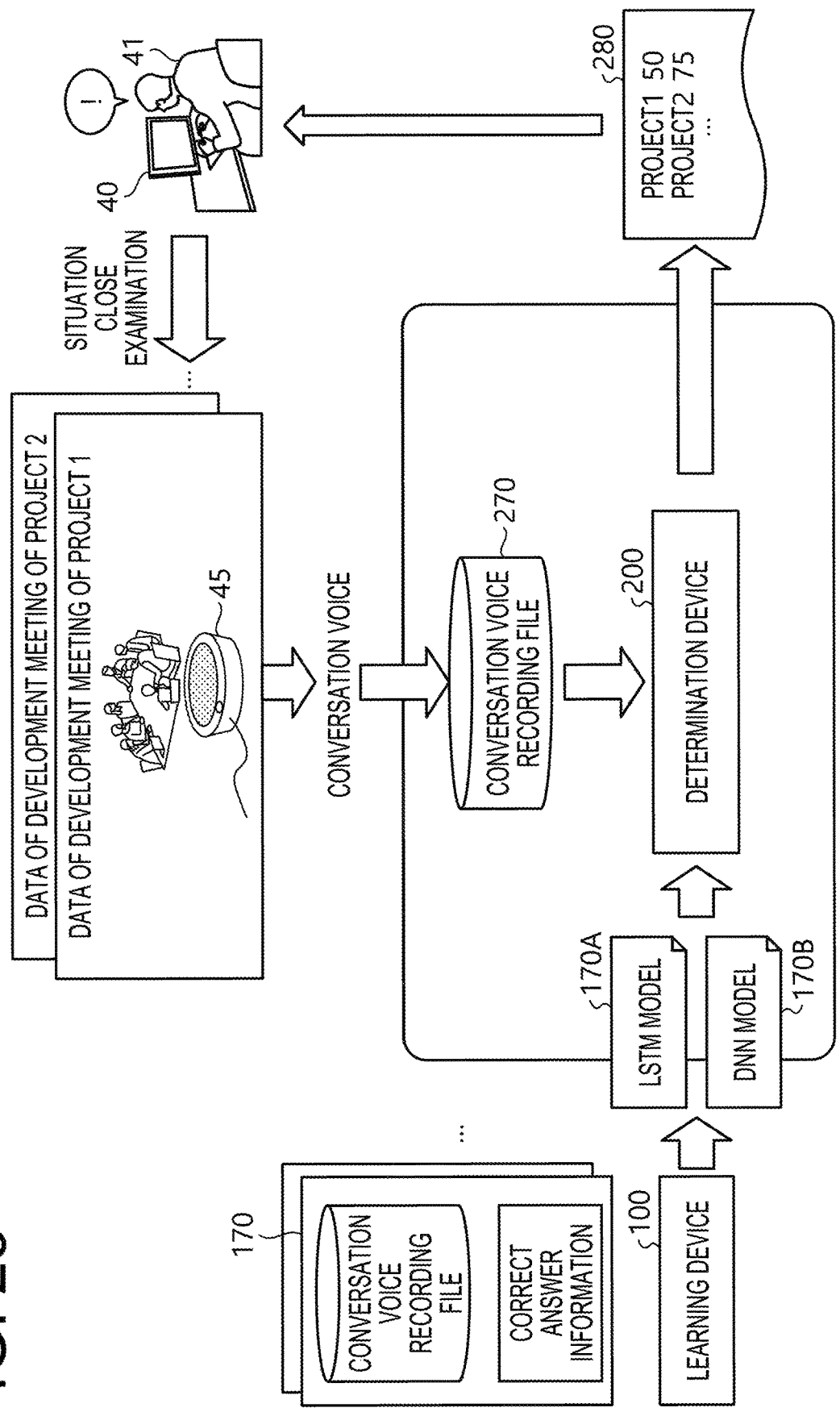
FIG. 25 is a view (1) illustrating an example of another system according to the present embodiment.

Subsequently, another system configuration of the present embodiment will be described. FIG. 25 is a view (1) illustrating an example of another system according to the present embodiment. In FIG. 25, as an example, description will be made using the learning device 100 and the determination device 200.

The learning device 100 learns an LSTM model 170A and a DNN model 170B based on learning data 170 of the past project. The learning data 170 includes a conversation voice recording file that records voice of a development project meeting conducted in the past, and correct answer information indicating whether or not the meeting is stagnated. The voice of the development meeting is recorded using a microphone 45.

The determination device 200 acquires the voice of the development project meeting as a conversation voice recording file 270, and uses the LSTM model 170A and the DNN model 170B to calculate stagnation degree information 280 of the development project meeting. The determination device 200 notifies the administrator terminal 40 of the stagnation degree information 280 of the development project meeting. An administrator 41 refers to the stagnation degree information 280 of the development project meeting, and performs a close examination of the situation.

By constructing the system illustrated in FIG. 25, it is possible to specify a development project meeting that tends to be stagnated, and promote an improvement.

Figure 26:
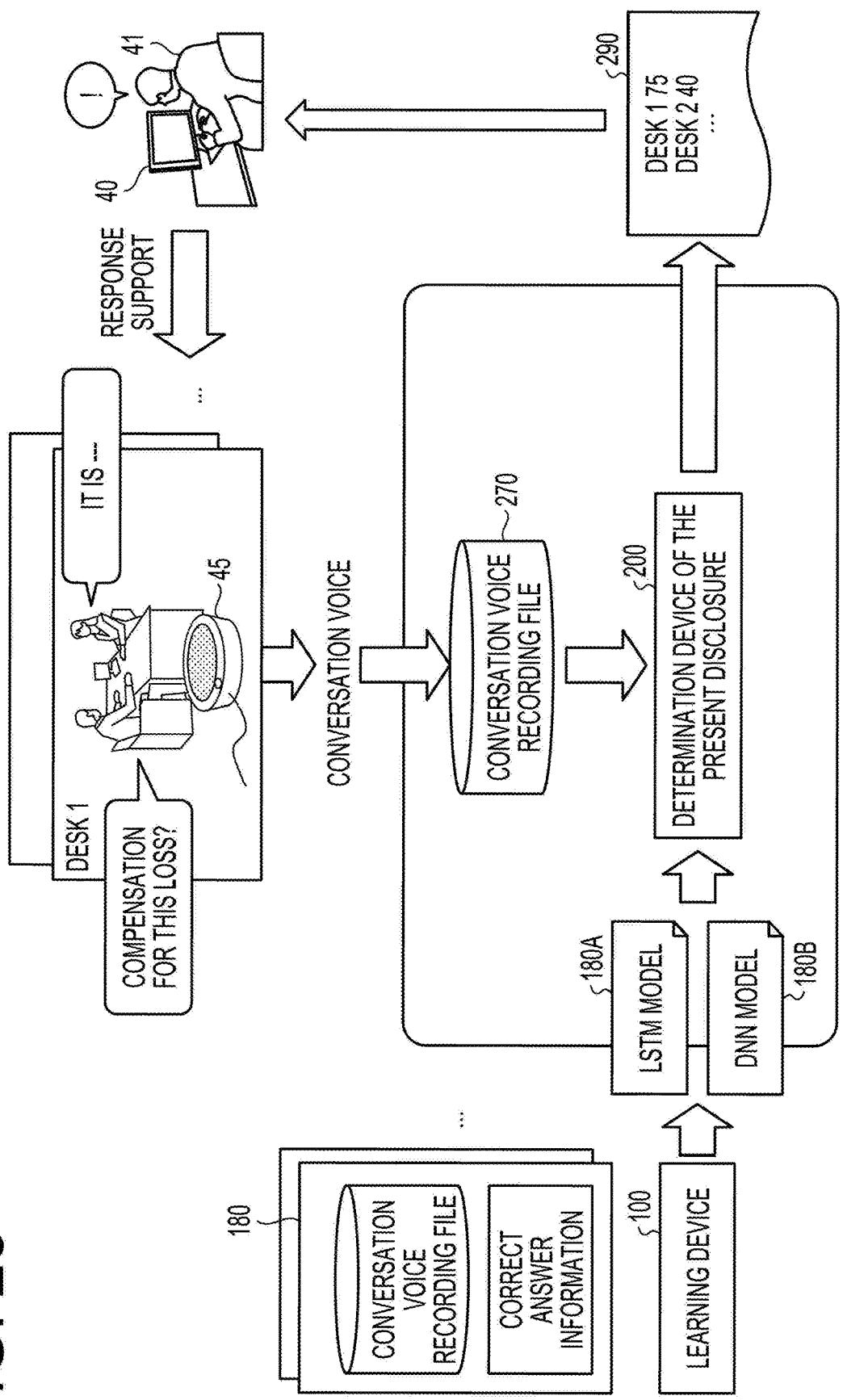
FIG. 26 is a view (2) illustrating an example of another system according to the present embodiment.

FIG. 26 is a view (2) illustrating an example of another system according to the present embodiment. In FIG. 26, as an example, description will be made using the learning device 100 and the determination device 200.

The learning device 100 learns an LSTM model 180A and a DNN model 180B based on learning data 180 of a conversation during a response performed at a desk. The learning data 180 includes a conversation voice recording file that records a conversation during a response performed at a desk in the past, and correct information on whether or not a trouble has occurred. The conversation during a response performed at a desk is recorded using a microphone 45.

The determination device 200 acquires the voice at the desk and calculates information 290 of certainty of a trouble occurrence using the LSTM model 180A and the DNN model 180B. The determination device 200 notifies the administrator terminal 40 of the information 290 of the certainty of a trouble occurrence. The administrator 41 refers to the information 290 of the certainty of a trouble occurrence, and performs a response support.

By constructing the system illustrated in FIG. 26, it is possible to detect the trouble occurrence when a response is performed at a desk, and perform a response support.

In the examples described in the first and second embodiments, the case where the learning device 100 (300) and the determination device 200 (400) are separate devices has been described. However, the present disclosure is not limited thereto. For example, the control unit 105 of the learning device 100 may have the same function as the control unit 205 of the determination device 200, to learn the LSTM model 110c and the DNN model 110d and determine whether or not a specific conversation situation is included in the voice data.

In the present embodiment, the specific conversation situation is described as an "abnormal conversation situation." However, the specific conversation situation is not limited to the abnormal conversation situation. For example, the specific conversation situation may be a conversation situation where a meeting is being stagnated, a conversation situation where a trouble is occurring, a conversation situation favorable to a customer, etc.

Figure 27:
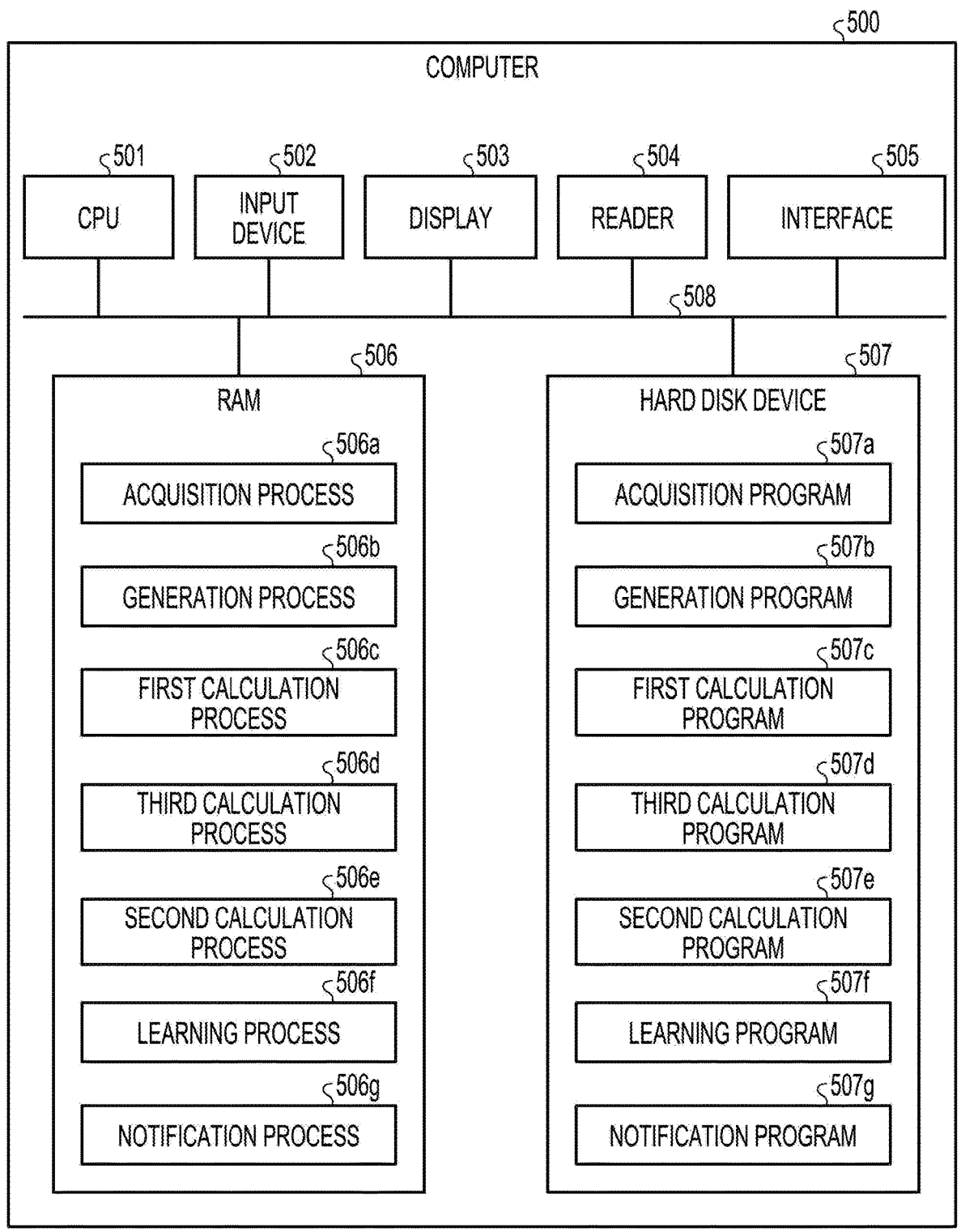
FIG. 27 is a view illustrating an example of a hardware configuration of a computer that implements the same function as the learning device according to the present embodiment.

Next, descriptions will be made on an example of a hardware configuration of a computer that implements the same functions as those of the learning device 100 (300) and the determination device 200 (400) described in the present embodiment. FIG. 27 is a view illustrating an example of a hardware configuration of a computer that implements the same function as the learning device according to the present embodiment.

As illustrated in FIG. 27, a computer 500 includes a CPU 501 that executes various arithmetic processes, an input device 502 that receives data from a user, and a display 503. The computer 500 further includes a reader 504 that reads a program or the like from a storage medium, and an interface 505 that exchanges data with the call recording device 30 and so on via a wired or wireless network. The computer 500 further includes a RAM 506 that temporarily stores various types of information, and a hard disk device 507. The devices 501 to 507 are connected to a bus 508.

The hard disk device 507 has an acquisition program 507a, a generation program 507b, a first calculation program 507c, a third calculation program 507d, and a second calculation program 507e. The hard disk device 507 further has a learning program 507f and a notification program 507g. The CPU 501 reads each of the programs 507a to 507g and deploys the read program on the RAM 506.

The acquisition program 507a functions as an acquisition process 506a. The generation program 507b functions as a generation process 506b. The first calculation program 507c functions as a first calculation process 506c. The third calculation program 507d functions as a third calculation process 506d. The second calculation program 507e functions as a second calculation process 506e. The learning program 507f functions as a learning process 506f. The notification program 507g functions as a notification process 506g.

The processing of the acquisition process 506a corresponds to the processing of the acquisition units 105a and 305a. The processing of the generation process 506b corresponds to the processing of the generation units 120 and 320. The processing of the first calculation process 506c corresponds to the processing of the first calculation units 130 and 330. The processing of the third calculation process 506d corresponds to the processing of the third calculation units 140 and 340. The processing of the second calculation process 506e corresponds to the processing of the second calculation units 150 and 350. The processing of the learning process 506f corresponds to the processing of the learning units 160 and 360. The processing of the notification process 506g corresponds to the processing of the notification units 105b and 305b.

In addition, the programs 507a to 507g may not necessarily be stored in the hard disk device 507 from the beginning. For example, the programs may be stored in a "portable physical medium" such as a flexible disk (FD), a CD-ROM, a DVD disk, a magneto-optical disk, an IC card or the like which is inserted in the computer 500. Then, the computer 500 may read and execute each of the programs 507a to 507g.

Figure 28:
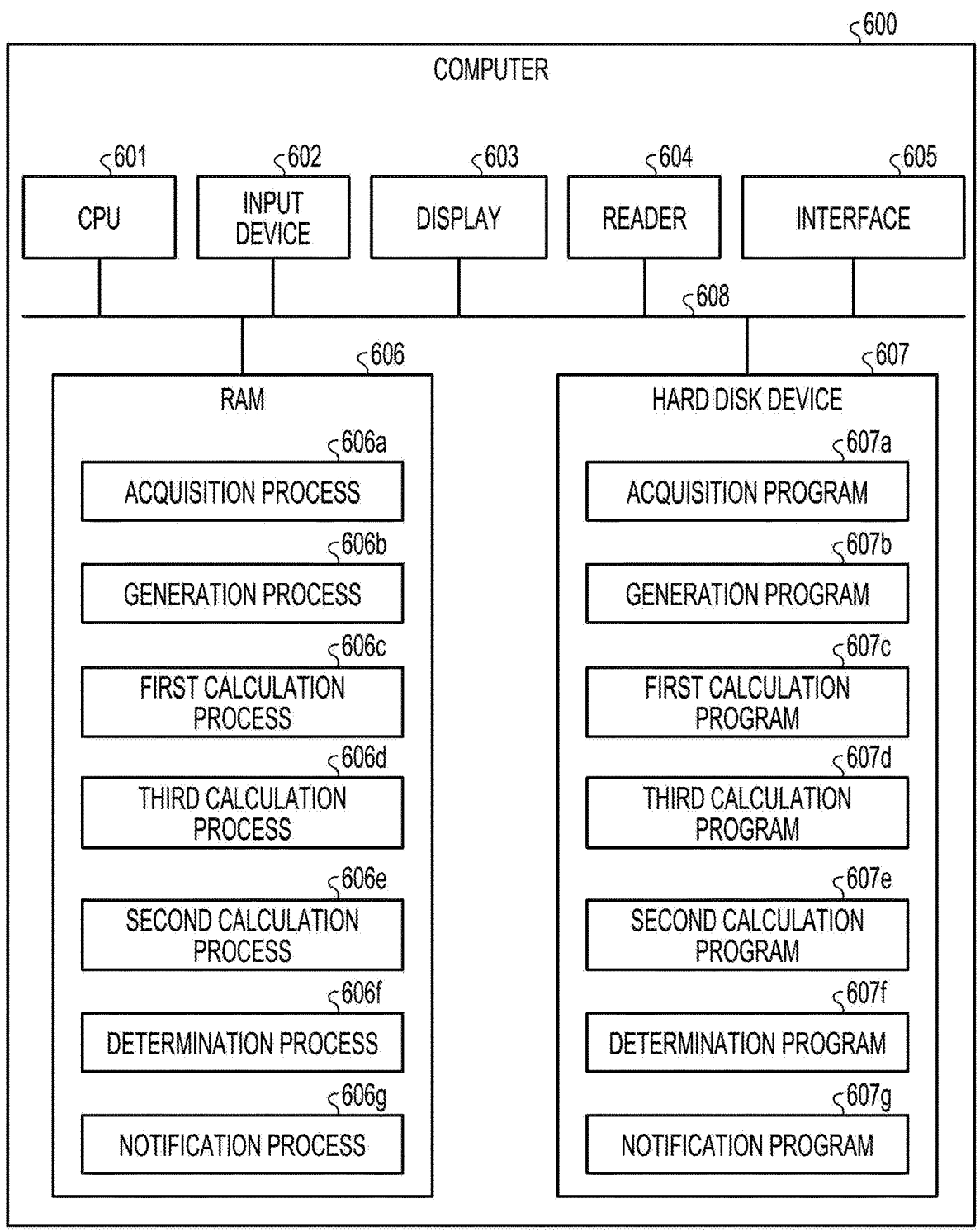
FIG. 28 is a view illustrating an example of a hardware configuration of a computer that implements the same function as the determination device according to the present embodiment.

FIG. 28 is a view illustrating an example of a hardware configuration of a computer that implements the same function as the determination device according to the present embodiment. As illustrated in FIG. 28, a computer 600 includes a CPU 601 that executes various arithmetic processes, an input device 602 that receives data from a user, and a display 603. The computer 600 further includes a reader 604 that reads a program or the like from a storage medium, and an interface 605 that exchanges data with the call recording device 30, the administrator terminal 40 and so on via a wired or wireless network. The computer 600 further includes a RAM 606 that temporarily stores various types of information, and a hard disk device 607. The devices 601 to 607 are connected to a bus 608.

The hard disk device 607 has an acquisition program 607a, a generation program 607b, a first calculation program 607c, a third calculation program 607d, and a second calculation program 607e. The hard disk device 607 further has a determination program 607f and a notification program 607g. The CPU 601 reads each of the programs 607a to 607g and deploys the read program on the RAM 606.

The acquisition program 607a functions as an acquisition process 606a. The generation program 607b functions as a generation process 606b. The first calculation program 607c functions as a first calculation process 606c. The third calculation program 607d functions as a third calculation process 606d. The second calculation program 607e functions as a second calculation process 606e. The determination program 607f functions as a determination process 606f. The notification program 607g functions as a notification process 606g.

The processing of the acquisition process 606a corresponds to the processing of the acquisition units 205a and 405a. The processing of the generation process 606b corresponds to the processing of the generation units 220 and 420. The processing of the first calculation process 606c corresponds to the processing of the first calculation units 230 and 430. The processing of the third calculation process 606d corresponds to the processing of the third calculation units 240 and 440. The processing of the second calculation process 606e corresponds to the processing of the second calculation units 250 and 450. The processing of the determination process 606f corresponds to the processing of the determination units 260 and 460. The processing of the notification process 606g corresponds to the processing of the notification units 205b and 405b.

In addition, the programs 607a to 607g may not necessarily be stored in the hard disk device 607 from the beginning. For example, the programs may be stored in a "portable physical medium" such as a flexible disk (FD), a CD-ROM, a DVD disk, a magneto-optical disk, an IC card or the like which is inserted in the computer 600. Then, the computer 600 may read and execute each of the programs 607a to 607g.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing apparatus, comprising:
a memory; and
a processor coupled to the memory and the processor configured to:
generate phoneme string information in which a plurality of phonemes included in voice information is arranged in time series, based on a recognition result of the phonemes for the voice information; and learn parameters of a network such that when the phoneme string information is input to the network, output information that is output from the network approaches correct answer information that indicates whether a predetermined conversation situation is included in the voice information, that corresponds to the phoneme string information, by calculating an internal vector of the phoneme string information.

2. The information processing apparatus according to claim 1, wherein the network includes a first network that has a recursive path and a second network that has no recursive path, and the processor is further configured to:

calculate the internal vector by inputting the phoneme string information to the first network;

calculate the output information by inputting information related to the internal vector to the second network; and learn a first set of parameters of the first network and a second set of parameters of the second network such that the output information approaches the correct answer information.

3. The information processing apparatus according to claim 2, wherein the first network is a long short term memory (LSTM).

4. The information processing apparatus according to claim 2, wherein the processor is further configured to:

calculate statistical information of a plurality of internal vectors output from the first network; and calculate the output information by inputting the statistical information to the second network.

5. The information processing apparatus according to claim 4, wherein the processor is further configured to:

calculate the statistical information based on weight parameters in a time direction; and learn the first set of parameters, the second set of parameters, and the weight parameters such that the output information approaches the correct answer information.

6. The information processing apparatus according to claim 4, wherein the processor is further configured to:

calculate an average vector of the plurality of internal vectors output from the first network; and calculate the output information by inputting the average vector to the second network.

7. The information processing apparatus according to claim 2, wherein the processor is further configured to:

extract a feature amount that includes at least one of a stress evaluation value or a conversation time based on the voice information;

generate a connected vector by connecting the internal vector and a vector of the feature amount; and calculate the output information by inputting the connected vector to the second network.

8. The information processing apparatus according to claim 1, wherein the processor is further configured to:

set the learned parameters in the network;

generate first phoneme string information in which a plurality of phonemes included in input voice information is arranged in time series, based on a result of recognition of phonemes for the input voice information; and determine whether a predetermined conversation situation is included in the input voice information, by inputting the first phoneme string information to the network.

9. A learning method, comprising:

generating, by a computer, phoneme string information in which a plurality of phonemes included in voice information is arranged in time series, based on a recognition result of the phonemes for the voice information; and learning parameters of a network such that when the phoneme string information is input to the network, output information that is output from the network approaches correct answer information that indicates whether a predetermined conversation situation is included in the voice information that corresponds to the phoneme string information, by calculating an internal vector of the phoneme string information.

10. The learning method according to claim 9, wherein the network includes a first network that has a recursive path and a second network that has no recursive path, and the learning method further comprises:

calculating the internal vector by inputting the phoneme string information to the first network;

calculating the output information by inputting information related to the internal vector to the second network; and learning a first set of parameters of the first network and a second set of parameters of the second network such that the output information approaches the correct answer information.

11. The learning method according to claim 10, wherein the first network is a long short term memory (LSTM).

12. The learning method according to claim 10, further comprising:

calculating statistical information of a plurality of internal vectors output from the first network; and calculating the output information by inputting the statistical information to the second network.

13. A non-transitory computer-readable recording medium having stored therein a program that causes a computer to execute a process, the process comprising:

generating phoneme string information in which a plurality of phonemes included in voice information is arranged in time series, based on a recognition result of the phonemes for the voice information; and learning parameters of a network such that when the phoneme string information is input to the network, output information that is output from the network approaches correct answer information that indicates whether a predetermined conversation situation is included in the voice information that corresponds to the phoneme string information, by calculating an internal vector of the phoneme string information.

14. The non-transitory computer-readable recording medium according to claim 13, wherein the network includes a first network that has a recursive path and a second network that has no recursive path, and the process further comprises:

calculating the internal vector by inputting the phoneme string information to the first network;

calculating the output information by inputting information related to the internal vector to the second network; and learning a first set of parameters of the first network and a second set of parameters of the second network such that the output information approaches the correct answer information.

15. The non-transitory computer-readable recording medium according to claim 14, wherein the first network is a long short term memory (LSTM).

16. The non-transitory computer-readable recording medium according to claim 14, the process further comprising:
calculating statistical information of a plurality of internal vectors output from the first network; and
calculating the output information by inputting the statistical information to the second network.

17. The non-transitory computer-readable recording medium according to claim 16, the process further comprising:
calculating the statistical information based on weight parameters in a time direction; and
learning the first set of parameters, the second set of parameters, and the weight parameters such that the output information approaches the correct answer information.

18. The non-transitory computer-readable recording medium according to claim 16, the process further comprising:
calculating an average vector of the plurality of internal vectors output from the first network; and
calculating the output information by inputting the average vector to the second network.

19. The non-transitory computer-readable recording medium according to claim 14, the process further comprising:
extracting a feature amount that includes at least one of a stress evaluation value or a conversation time based on the voice information;
generating a connected vector by connecting the internal vector and a vector of the feature amount; and
calculating the output information by inputting the connected vector to the second network.

20. The non-transitory computer-readable recording medium according to claim 13, the process further comprising:
setting the learned parameters in the network;
generating first phoneme string information in which a plurality of phonemes included in input voice information is arranged in time series, based on a result of recognition of phonemes for the input voice information; and
determining whether a predetermined conversation situation is included in the input voice information, by inputting the first phoneme string information to the network.

* * * * *